(12) United States Patent
Koslowski

(10) Patent No.: US 11,731,565 B2
(45) Date of Patent: Aug. 22, 2023

(54) ROOF RACK AND SUNSHADE FOR A CONVERTIBLE ROOF

(71) Applicant: MyTop IP, LLC, Atlanta, GA (US)

(72) Inventor: Christoph Koslowski, Northwest Atlanta, GA (US)

(73) Assignee: MYTOP IP. LLC, Atlanta, GA (US)

( * ) Notice: Subject to any disclaimer, the term of this patent is extended or adjusted under 35 U.S.C. 154(b) by 72 days.

(21) Appl. No.: 17/533,525

(22) Filed: Nov. 23, 2021

(65) Prior Publication Data

US 2022/0169184 A1 Jun. 2, 2022

Related U.S. Application Data

(60) Provisional application No. 63/119,702, filed on Dec. 1, 2020.

(51) Int. Cl.
*B60J 7/06* (2006.01)
*B60R 9/04* (2006.01)

(52) U.S. Cl.
CPC .. *B60R 9/04* (2013.01); *B60J 7/06* (2013.01)

(58) Field of Classification Search
CPC ... B60R 9/00; B60R 9/04; B60R 9/045; B60J 1/2077; B60J 1/2063
See application file for complete search history.

(56) References Cited

U.S. PATENT DOCUMENTS

| 4,899,917 A | 2/1990 | Bott |
| 6,158,637 A | 12/2000 | Fisch et al. |
| 6,161,893 A | 12/2000 | Ewing et al. |
| 6,530,621 B1* | 3/2003 | Williams ............... B60J 7/102 296/147 |
| 6,851,739 B2 | 2/2005 | Morley |
| 6,899,380 B2 | 5/2005 | Kralik et al. |
| 7,376,615 B2* | 5/2008 | Brixius ............... G06Q 40/04 705/37 |
| 7,448,523 B2 | 11/2008 | Aftanas et al. |
| 9,415,669 B2* | 8/2016 | Barker ............... B60J 7/1265 |
| 10,035,408 B2 | 7/2018 | Crismon et al. |
| 10,071,692 B2 | 9/2018 | Kmita et al. |
| 2005/0092796 A1 | 5/2005 | Essig |
| 2013/0341972 A1* | 12/2013 | Choi ............... B60J 7/0015 296/214 |
| 2015/0027647 A1* | 1/2015 | Dietl ............... B60J 1/2019 29/434 |

OTHER PUBLICATIONS

Spiderwebshade JL2D Install Instructions (published Nov. 18, 2020).
Spiderwebshade JLKini Install Instructions (published Nov. 18, 2020).
Spiderwebshade Front Installation (published Nov. 18, 2020).
Spiderwebshade Rear Installation (published Nov. 18, 2020).
Spiderwebshade (published Nov. 18, 2020).

* cited by examiner

*Primary Examiner* — Corey N Skurdal
(74) *Attorney, Agent, or Firm* — Harness Dickey & Pierce PLC

(57) ABSTRACT

A roof rack attachable to a convertible roof is provided. A further aspect employs a roof rack with a mounting bracket removeably insertable into a hole or pocket of a fabric convertible roof. In another aspect, a roller sunshade for a convertible roof is provided. Moreover, an additional aspect is of a sunshade assembly which includes a forwardly extendable shade and wind-up roller, and a rearwardly extendable roller shade and wind-up roller.

21 Claims, 21 Drawing Sheets

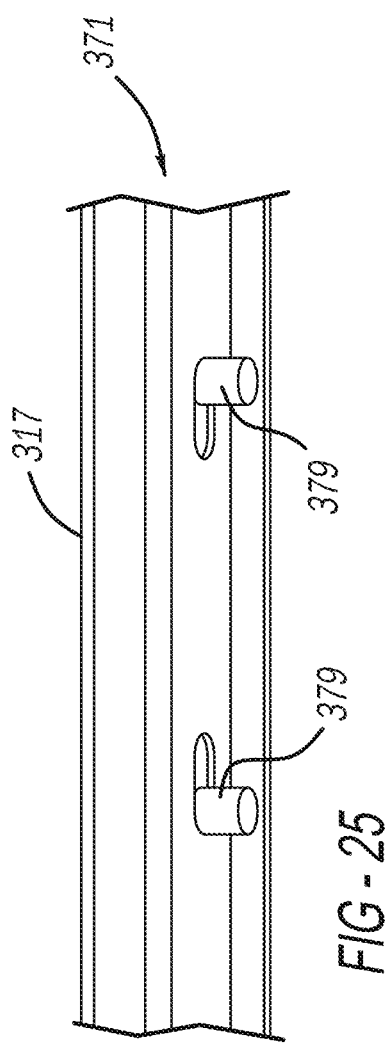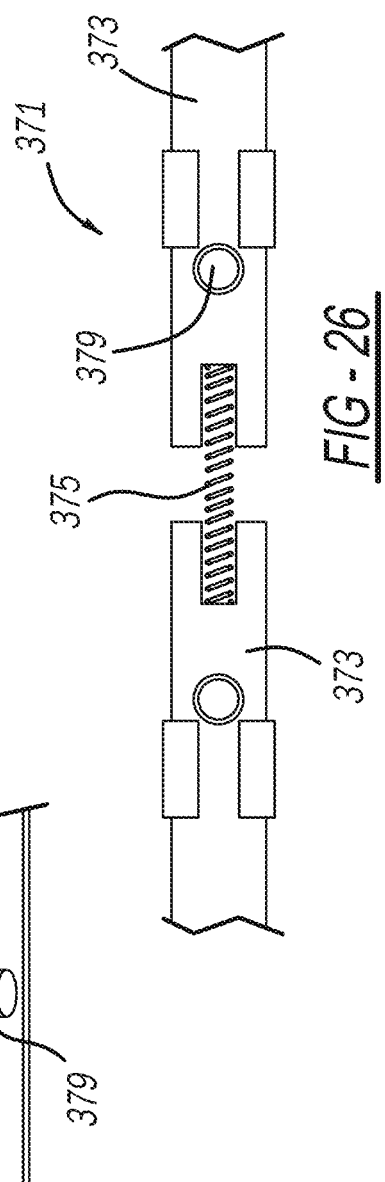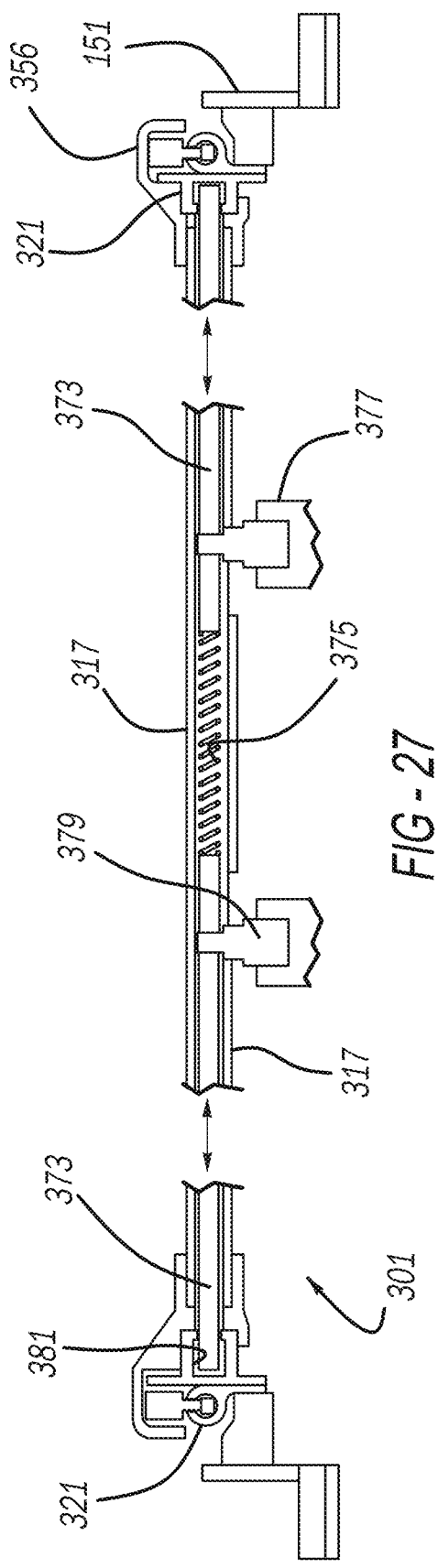

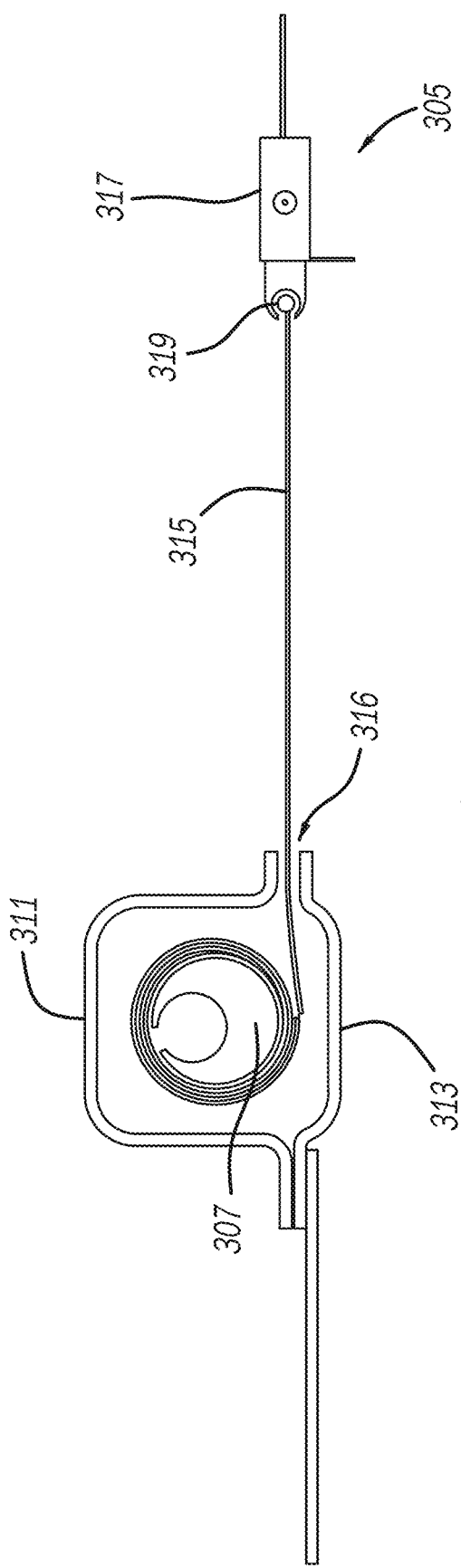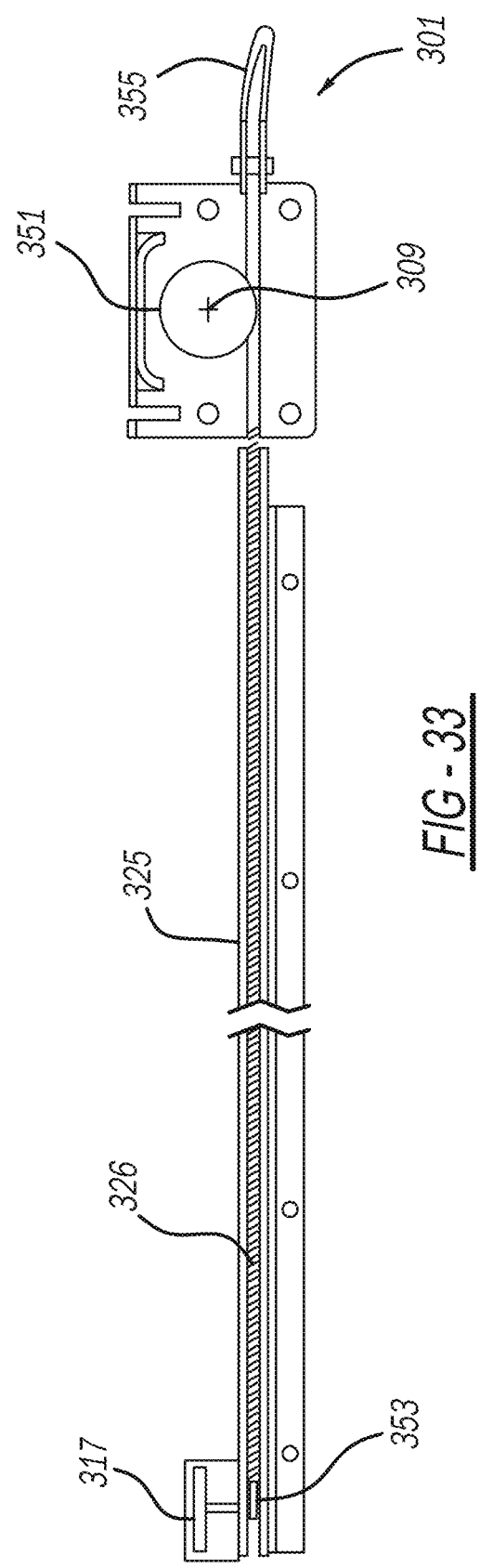

ROOF RACK AND SUNSHADE FOR A CONVERTIBLE ROOF

CROSS-REFERENCE TO RELATED APPLICATIONS

This application claims priority to U.S. Provisional Patent Application No. 63/119,702 filed on Dec. 1, 2020, which is incorporated by reference herein.

BACKGROUND AND SUMMARY

The present disclosure relates generally to convertible roofs and more particularly to a roof rack and sunshade for a convertible roof used with an automotive vehicle.

Soft top convertible roofs for automotive vehicles are well known. It has been difficult to attach a roof rack to vehicles with a traditional convertible roof, since the top stack mechanism may not support the roof rack and cargo mounted thereon without damage or collapsing during normal vehicle use on a bumpy road. Furthermore, attachment of a conventional roof rack to a convertible roof is problematic and may lead to undesirable fabric tears or water leakage. For example, reference should be made to U.S. patent publication no. 2005/0092796 entitled "Roof Rack for a Sport Utility Vehicle" which published to Essig on May 5, 2005; and U.S. Pat. No. 10,035,408 entitled "Vehicle Roof System Mounting to Existing Frame and Attachment Points" which issued to Crismon et al. on Jul. 31, 2018. These patents are incorporated by reference herein. The conventional roof racks and convertible tops of these patents employ very complicated mechanisms and are undesirably heavy. Furthermore, the Crismon patent has slotted side rails within which lateral sides of top panels slide, rather than having a top stack mechanism which entirely retracts a convertible roof to a lowered position. The Essig patent publication requires considerable clearance above and on the side of the vehicle to pivot the roof rack, and its large device appears cumbersome to entirely remove from the vehicle.

A roller sunshade is disclosed in the following U.S. Pat. No. 6,161,893 entitled "Sunshade for an Automotive Vehicle Roof" which issued to Ewing et al. on Dec. 19, 2000; and U.S. Pat. No. 6,899,380 entitled "Sunshade for a Motor Vehicle Roof" which issued to Kralik et al. on May 31, 2005. These patents are incorporated by reference herein. These conventional sunshades, however, are intended for use with a sliding sunroof and employ helically wound torsion springs which undesirably increase the size and rattling noise of the roller mechanism. Moreover, various aspects of these traditional sunshades use electric motor actuation which undesirably adds weight and complexity, and are difficult to package.

In accordance with the present invention, a roof rack attachable to a convertible roof is provided. In another aspect, a roller sunshade for a convertible roof is provided. A further aspect employs a roof rack with a mounting bracket removeably insertable into a hole or pocket of a fabric convertible roof. Still another aspect employs a roof rack with a mounting bracket removeably coupled to a stationary fore-and-aft extending structure, such as a roll bar or stationary side rail of a vehicle, with a convertible roof cover located between the stationary structure and cross-car extending beams.

Moreover, an additional aspect is of a sunshade assembly which includes a forwardly extendable shade and wind-up roller, and a rearwardly extendable roller shade and wind-up roller. Another aspect includes a sunshade assembly having fore-and-aft elongated side rails within which move cables and side edges of a flexible sunshade. An additional aspect of an overhead sunshade apparatus includes a flexible sunshade which is manually retractable around a roller, and side rail-located cables which wind and unwind the roller. A further aspect of a sunshade apparatus includes a manually moveable handle attached to a leading edge of a flexible sunshade which has a spring-biased slider operably to temporarily secure the sunshade in an extended position. Yet another aspect includes a convertible roof with a drain trough and an adjacent hinged frame coupled to a stationary structural side rail. Methods of assembling and using roof racks and sunshades for an automotive convertible roof apparatus are also provided.

The present apparatus is advantageous over prior constructions. For example, the present rook rack apparatus is lightweight, strong and usable with a soft top convertible roof. The present roof rack is easily installed and adjustable to fit different convertible roof size configurations. The present roof rack and convertible top assembly are well suited for use to retain luggage containers, bicycle racks, tents, ski racks, surfboards, paddle boards, and the like on the cross-car extending beams thereof.

The present sunshade apparatus advantageously allows for independent front and/or rear opening or closing. The present sunshade apparatus also beneficially has small diameter wind-up rollers and reduced rattling noise, by avoiding the use of torsion springs in the roller assemblies in a preferred embodiment. Furthermore, the present sunshade system securely closes the side and leading edges of the sunshades when closed, thereby deterring noise and movement due to wind rush during vehicular movement. The present sunshade apparatus is ideally suited for use with a convertible roof, and especially in an SUV vehicle with roll bars and a central stationary and rigid roof area between open front and rear roof areas. Additional advantages and features of the present apparatus will become apparent from the following description and appended claims, taken in conjunction with the accompanying drawings.

BRIEF DESCRIPTION OF THE DRAWINGS

FIG. 25 is a fragmentary perspective view showing a latch actuator of the sunshade assembly;

FIG. 26 is a fragmentary bottom elevational view showing the latch actuator of the sunshade assembly;

FIG. 27 is a cross-sectional view, taken along line 27-27 of FIG. 21, showing the latch, latch actuator and latch receptacle of the sunshade assembly;

FIG. 32 is an enlarged cross-sectional view, taken along line 30-30 of FIG. 21, showing the rear sunshade sub-assembly, with the rear sunshade in the extended position; and FIG. 33 is a cross-sectional view, taken along line 33-33 of FIG. 21, showing the sunshade assembly through a side rail and cable actuator.

DETAILED DESCRIPTION

Figure 1:
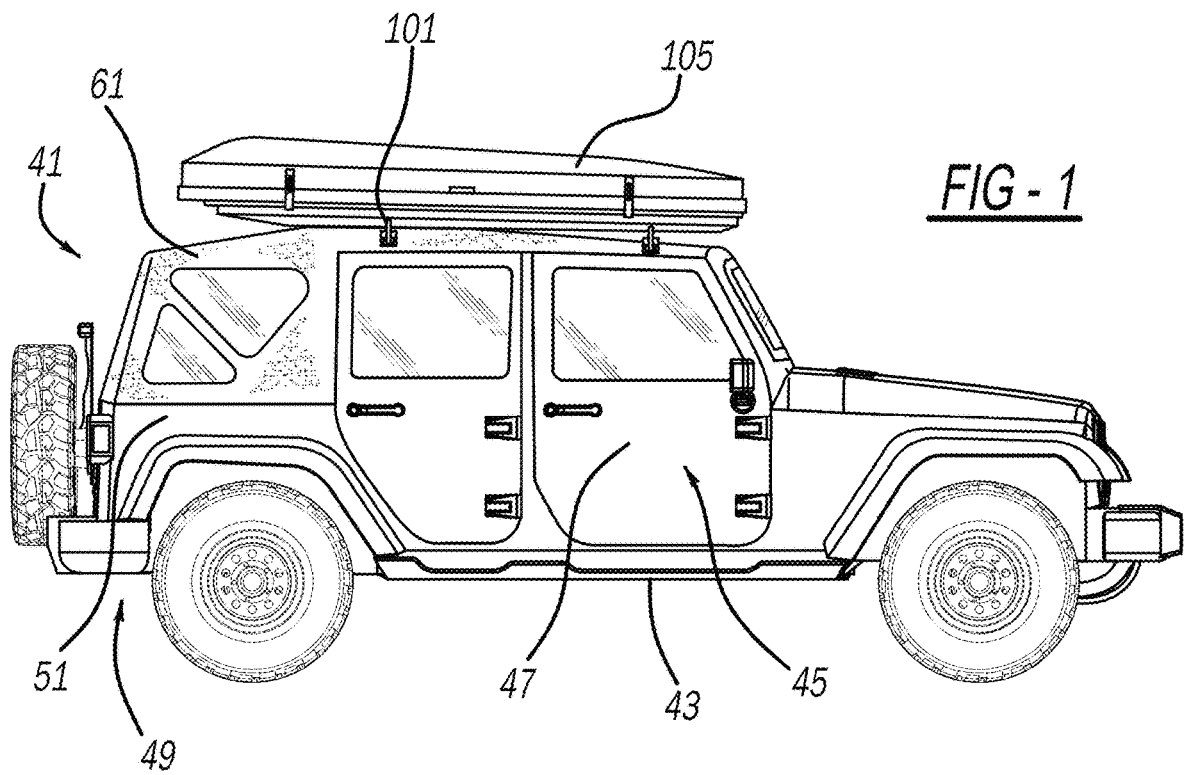
FIG. 1 is a side elevational view showing a convertible roof with a roof rack.
Figure 6:
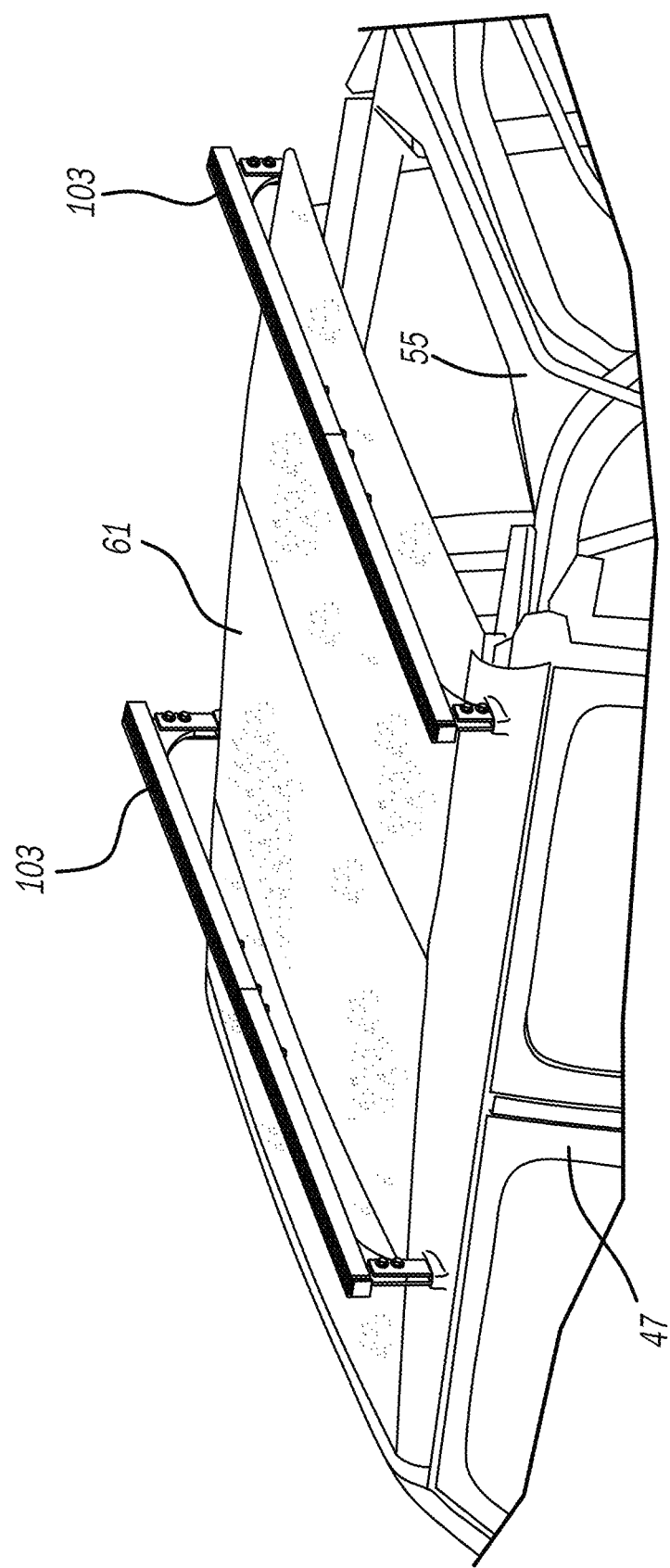
FIG. 6 is a top perspective view of the roof rack and convertible roof, in a raised position with a rear portion of a roof cover removed.
Figure 7:
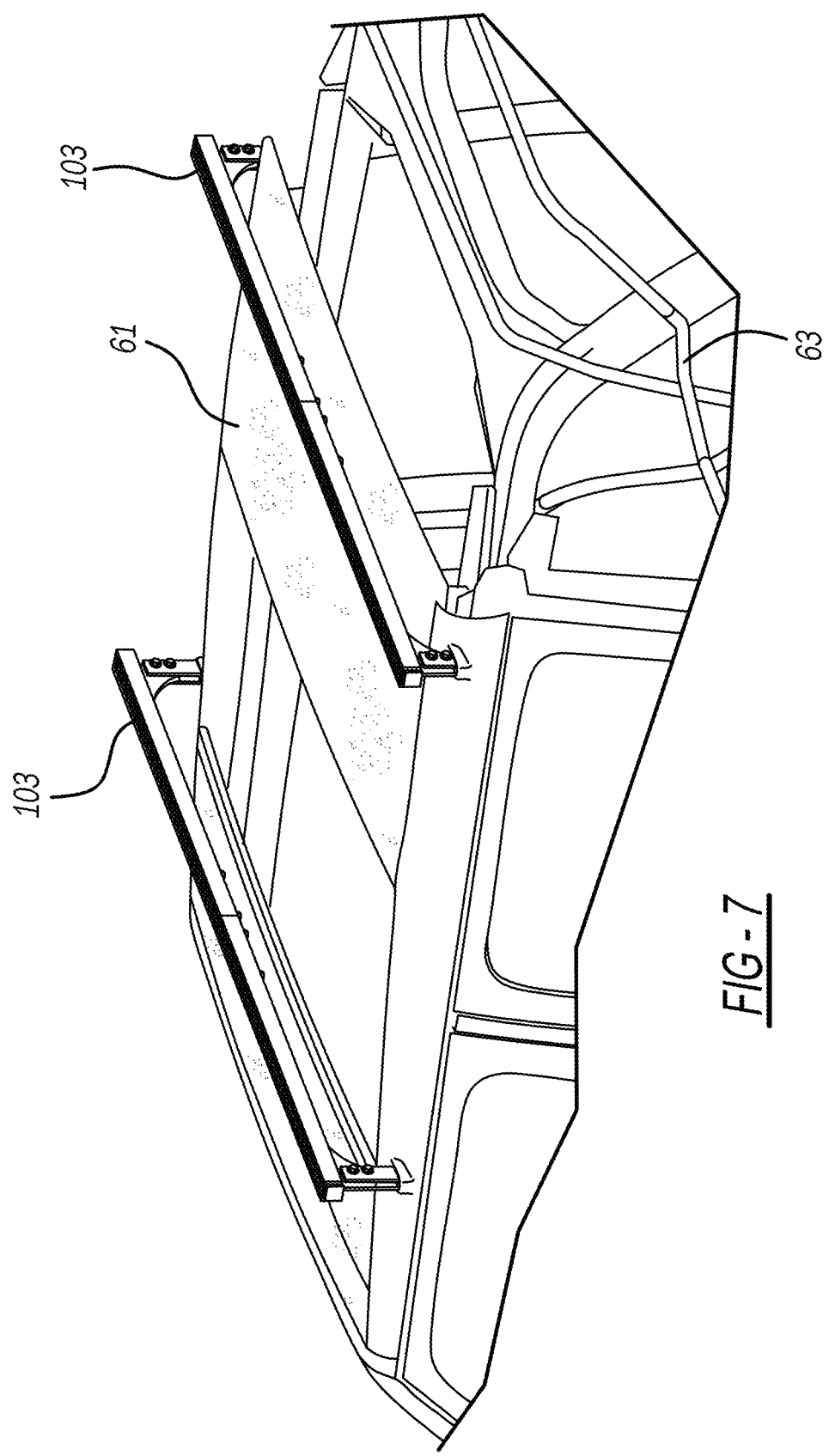
FIG. 7 is a top perspective view of the roof rack and convertible roof, in a raised position with front and rear portions of the roof cover removed.
Figure 8:
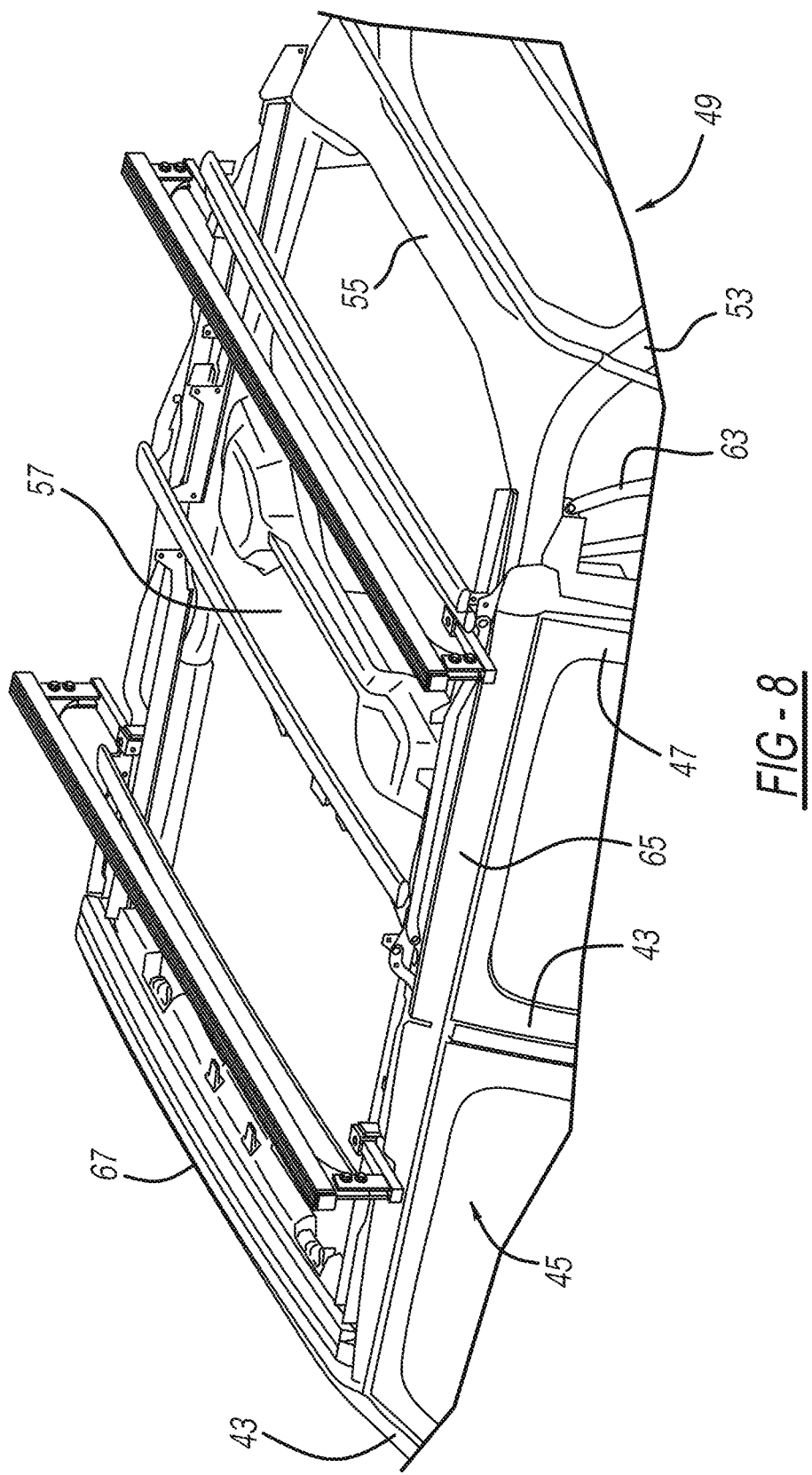
FIG. 8 is a top perspective view of the roof rack and convertible roof, in a raised position with the entire roof cover removed.
Figure 9:
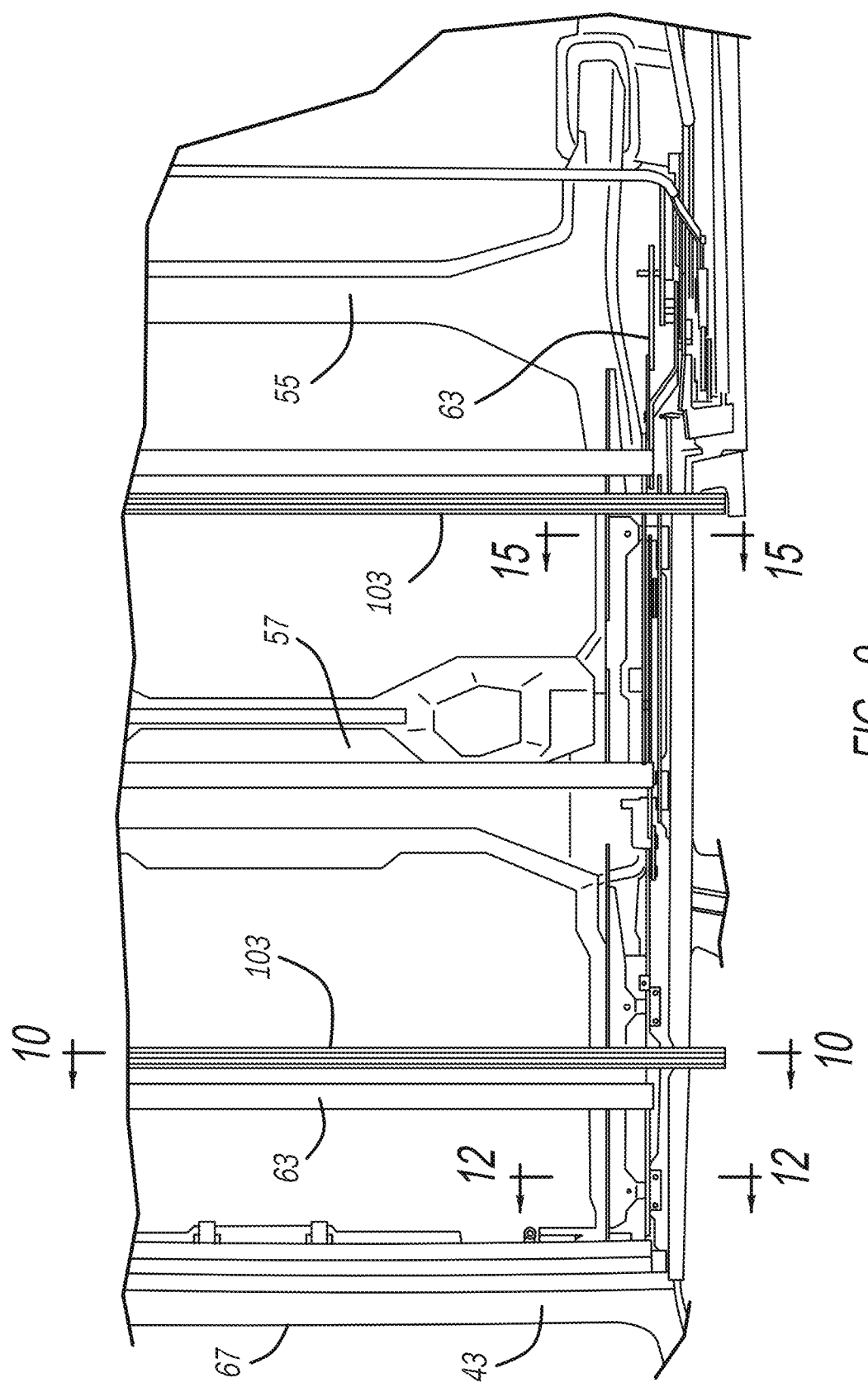
FIG. 9 is a top elevational view of the roof rack and convertible roof, in a raised position with the entire roof cover removed.
Figure 10:
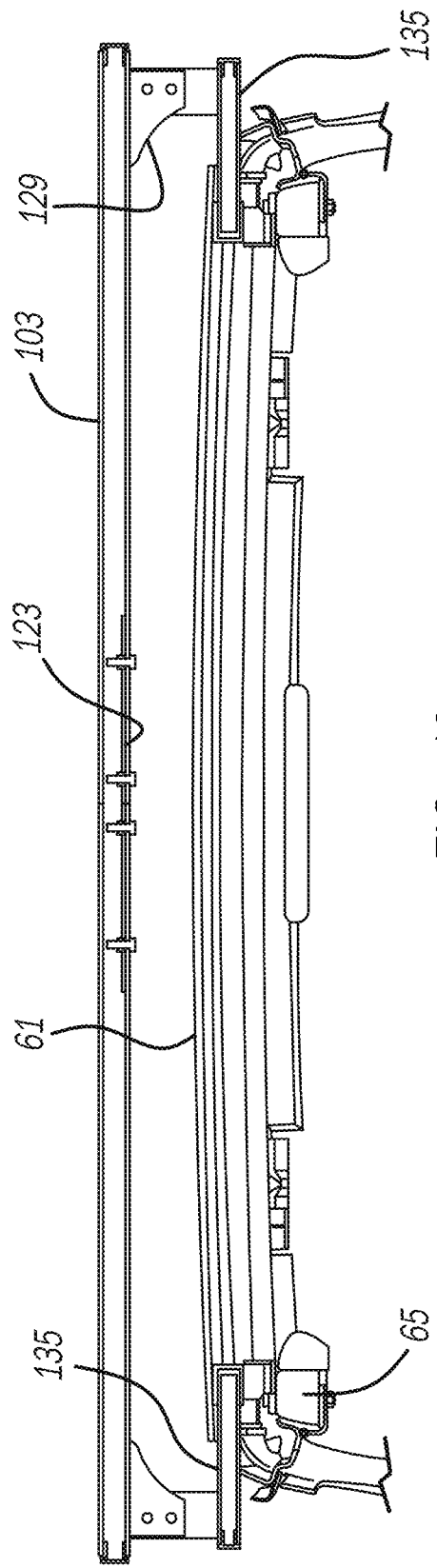
FIG. 10 is a fragmentary front view, taken along line 10-10 of FIG. 9, showing the roof rack and convertible roof, in a raised position.
Figure 11:
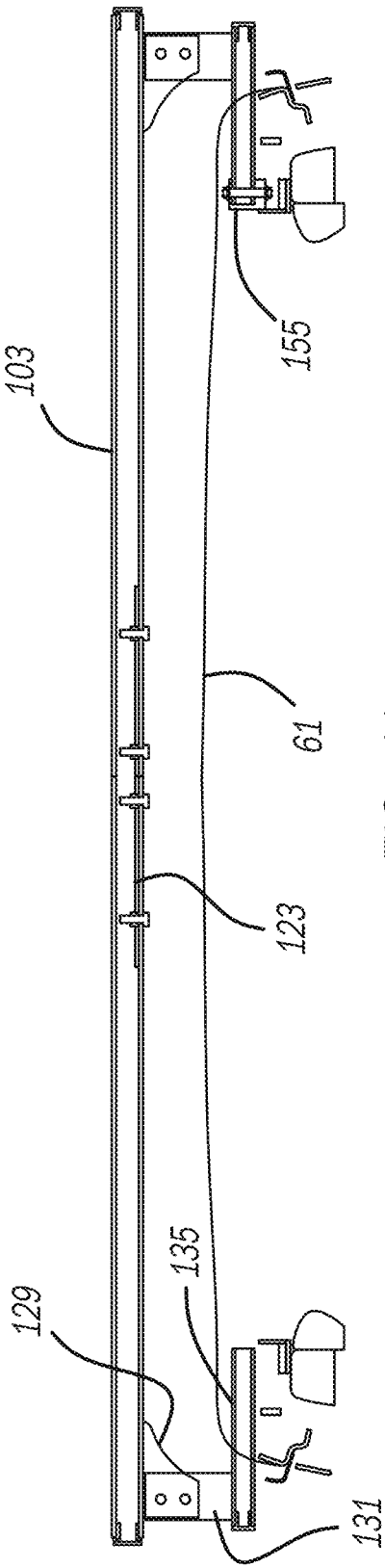
FIG. 11 is a cross-sectional view, taken along line 10-10 of FIG. 9, showing the roof rack and convertible roof, in a raised position.

A convertible roof apparatus 41 is employed on an automotive vehicle 43, preferably a sport utility vehicle ("SUV") such as a Jeep® brand vehicle. This can best be observed in FIGS. 1, 6 and 8. Automotive vehicle 43 has an engine compartment, a passenger compartment 45 between opposite side passenger doors 47, and a rear cargo compartment 49 defined by a generally horizontal bed, generally vertically extending sidewalls 51 and a moveable rear door or tailgate. Auxiliary passenger seating may be present within the rear compartment. Preferably there are four side passenger doors (with associated door openings if the doors are removed).

Furthermore, a pair of diagonally extending and tubular roll bars 53 span above rear compartment 49 adjacent to the sidewalls 51 in a spaced apart manner. An optional horizontally elongated roll bar or structural rear header 55 is coupled between the generally diagonally extending roll bar members. The diagonal roll bars may be partially or continuously curved. Roll bars 53 are rigidly mounted in a stationary manner to the vehicle's sheet metal structure. Additionally, an intermediate structural panel 57 laterally extends in a cross-car manner between parallel and fore-and-aft elongated, stationary side rail or roll bar structures 65. Overhead speakers and dome lamps are attached to intermediate panel 57, which is generally located between front and rear seating areas within the passenger compartment.

Convertible roof apparatus 41 includes a soft-top fabric roof cover 61 connected to a moveable top stack mechanism 63. A rear window or backlite, and optional side windows are attached to roof cover 61, and are preferably a flexible polymeric and transparent material. Weather strips and latches interface between the convertible roof and side structure 65 surrounding passenger doors 47 and above a front windshield at a front header 67. Convertible roof 41 is moveable from a fully raised and closed position shown in FIGS. 1 and 6 to a fully retracted and open position (not shown) behind and below rear header 55 and behind passenger compartment 45.

The top stack linkage mechanism is like that disclosed in commonly owned U.S. patent application Ser. No. 16/896,717 entitled "Interchangeable Convertible Roof Apparatus" which was filed on Jun. 9, 2020, and is incorporated by reference herewithin. Alternately, the rail and linkage components may be similar to those described in commonly owned U.S. Pat. No. 9,415,669 entitled "Retractable Top for an Open Vehicle" which issued to Barker on Aug. 16, 2016, and is incorporated by reference herein.

A roof rack apparatus 101 is mounted to stationary and structural portions of vehicle 43 such that cross-car and laterally elongated beams 103 are spaced above roof cover 61 and are longitudinally spaced apart from each other. Preferably, only two such beams 103 are desired although more can alternately be employed. A cargo box or container 105 is removably clamped or strapped onto beams 103 such that the container longitudinally spans between the beams without touching roof cover 61. It is also envisioned that bicycle racks, tents, ski racks, surfboards, paddle boards, and the like, can be removably attached to beams 103.

Figure 2:
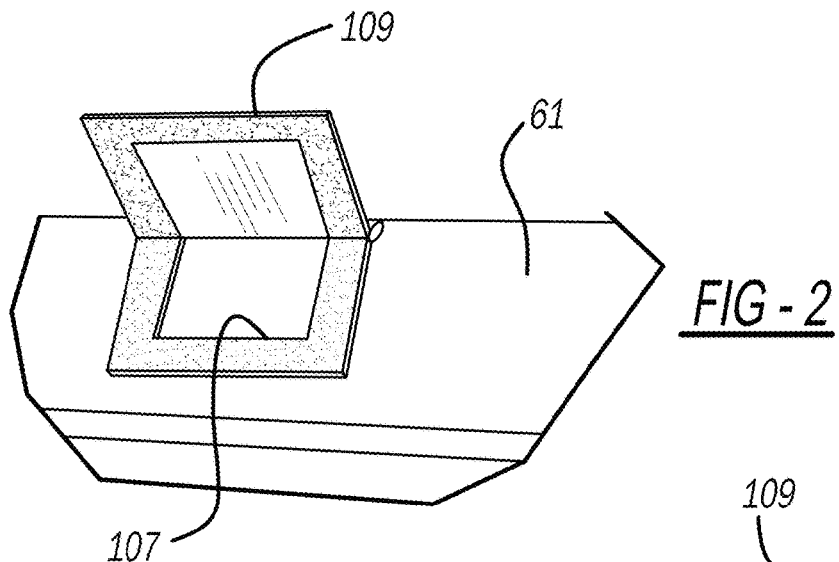
FIG. 2 is a side perspective view showing a roof rack-access hole in the convertible roof, in an open position.
Figure 3:
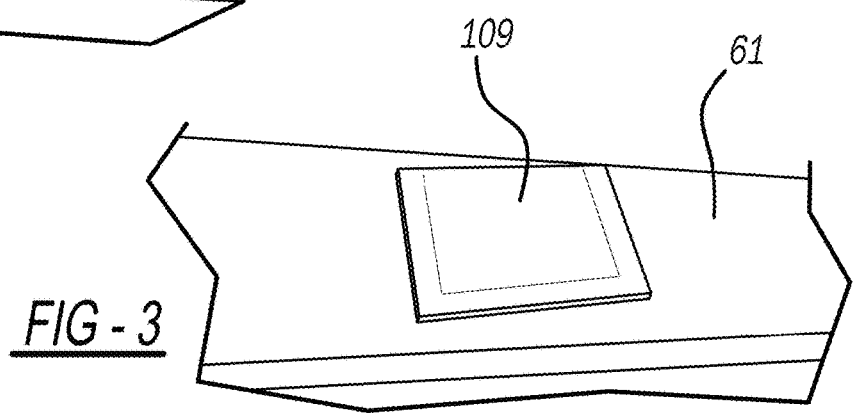
FIG. 3 is a side perspective view showing the roof rack-access hole in the convertible roof, in a closed position.
Figure 4:
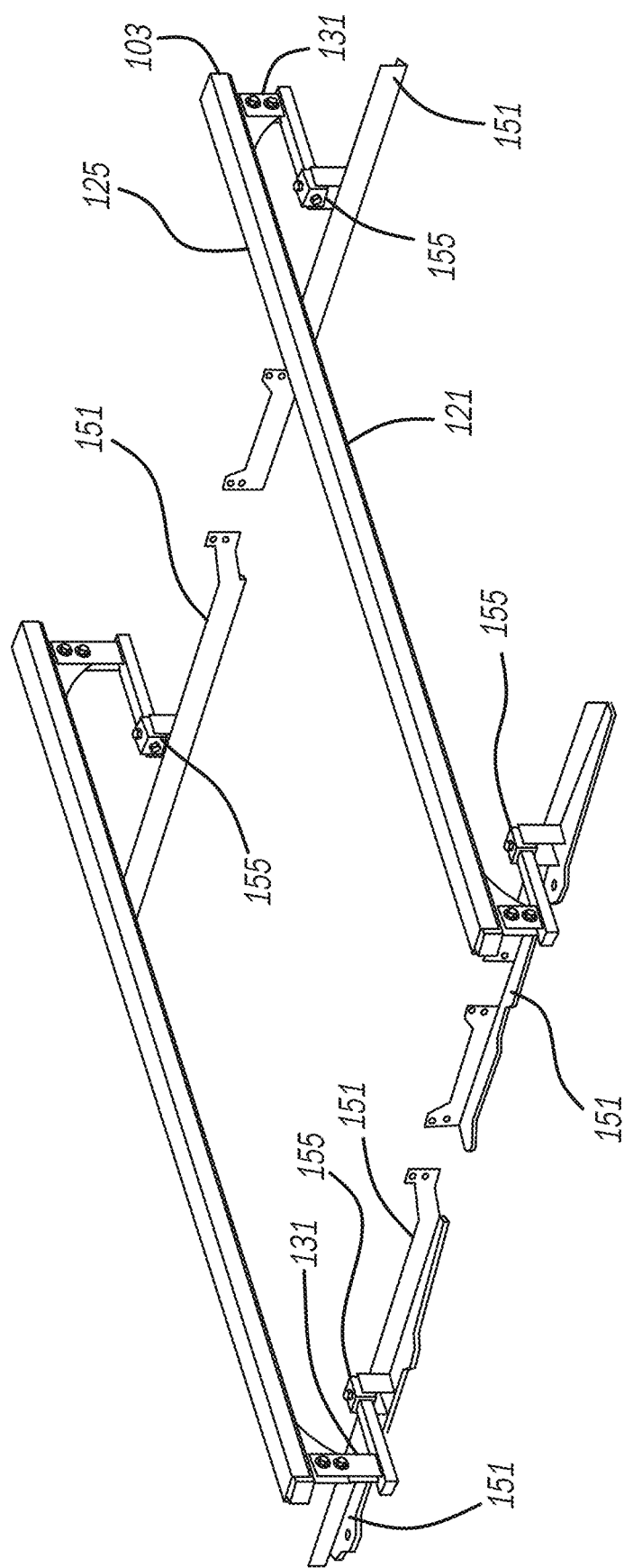
FIG. 4 is a top perspective view showing the roof rack.
Figure 5:
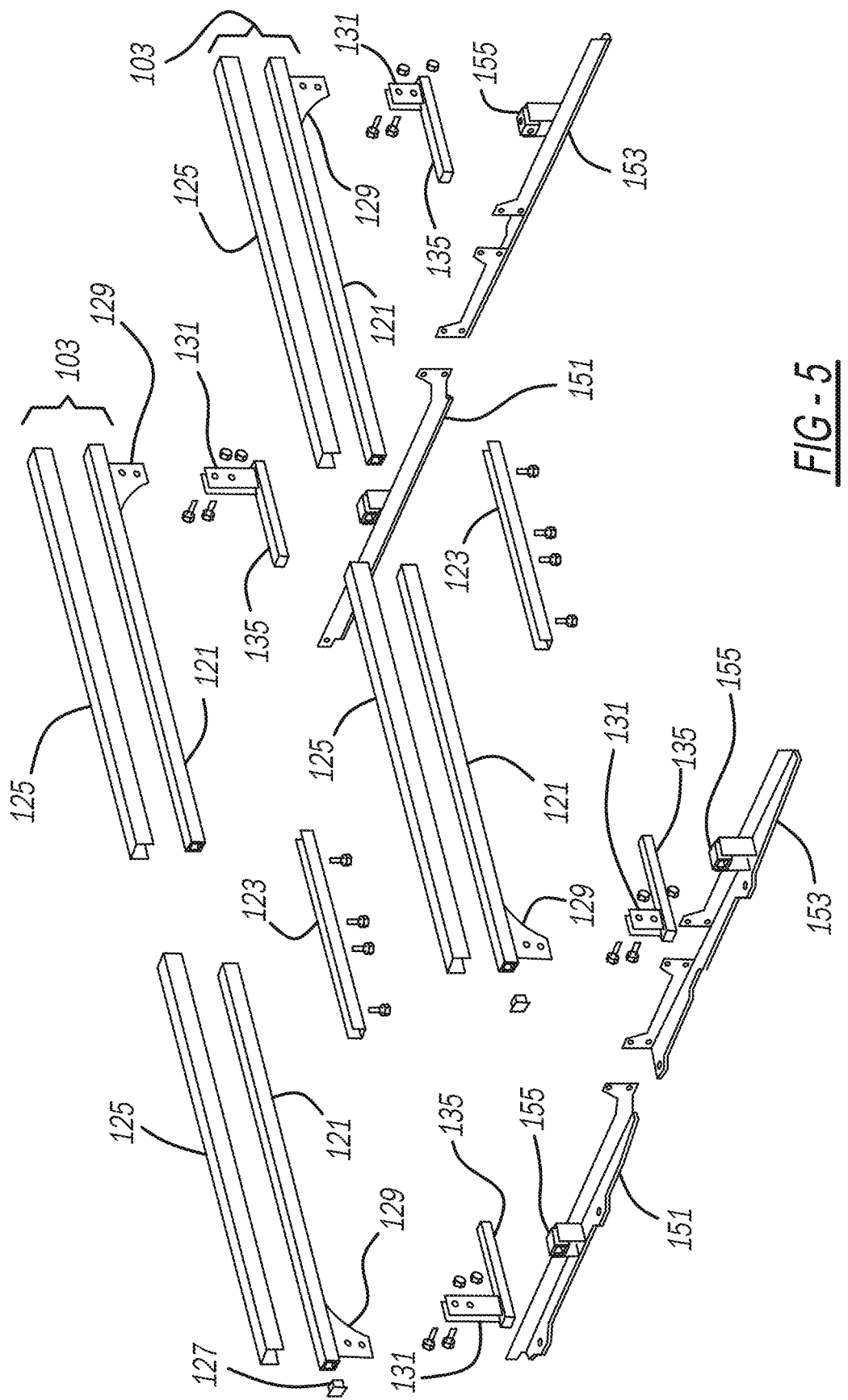
FIG. 5 is an exploded top perspective view showing the roof rack.

FIGS. 2 and 3 illustrate one of four holes 107 in roof cover 61 adjacent to its side edge. A fabric flap 109 has an upper edge sewn or otherwise attached to the roof cover while portions of the flap adjacent to its bottom and/or side edges, have a hook-and-loop or other fastener attached thereto. Thus, each flap 109 can be removably pivoted from a raised orientation (see FIG. 2) exposing hole 107, to a closed orientation (see FIG. 3) covering the hole. Alternately, an enclosed fabric or flexible polymeric pocket can be sewn or adhesively bonded to an inside of top cover 61 corresponding to each hole 107 to deter water and wind entry when the flap is open, and to deter rattles between attached roof rack-to-vehicle components.

Reference should now be made to FIGS. 4-15. Beams 103 each include a pair of aligned, extruded metallic tubes 121 of generally square cross-sectional shape, such as steel, however, aluminum, fiber filled polymeric or composite materials may alternately be used. A generally U-shaped connector bracket 123 couples together inner ends of aligned pairs of tubes 121 with screws, rivets or other such fasteners. Alternately, a single piece and longer tube can be used instead of the two aligned tubes and the connector. A generally inverted U-shaped elastomeric cap 125 is adhesively bonded, snap fit or riveted to attach to and cover an upper surface of each tube. A polymeric plug 127 is inserted into each end of tube 121.

A metallic corner bracket 129 is coupled to tube 121 adjacent each outboard end thereof. Corner bracket 129 has a generally triangular front view peripheral shape. Furthermore, a vertically elongated extension plate 131 is adjustably coupled to each corner bracket 129 via threaded fasteners 133 and oversized slots. A bottom of each plate 131 is coupled to a cross-car elongated shaft 135. Plate 131 may be welded, screwed, riveted or otherwise attached adjacent to an outboard end of metallic shaft 135 with a majority of the shaft extending inboard therefrom. Shaft preferably has a generally square cross-sectional shape but may alternately have a curved cylindrical or other shape. A polymeric plug 137 is placed in an outboard end thereof.

Forwardly extending elongated braces 151 and a rearwardly extending elongated braces 153 each include an upstanding hollow receiver 155 adjacent a top thereof. An outboard face of each receiver 155 has an opening 157 therein which is sized and shaped to match an innermost end of shaft 135. An inboard wall of each channel abuts against the innermost end of shaft 135 as can best be observed in FIG. 14. The receiver and shaft connection beneficially allows for lateral tolerance variations of the vehicle and/or roof rack components during assembly. Braces 151 and 153 are fastened on top of structural side rail or roll bar 65. Polymeric interior trim 159 and a fabric interior headliner 161 are also attached to roll bar 65.

Alternately, opening 157 may be in an upper surface of receiver 155 with the cross-car facing, inboard end of shaft 135 having a hook-like shape or bent tab to removably engage within the upper opening. Alternately, shafts 135 may downwardly extend from each beam 103, with optional brackets and/or extension plates therebetween, such that a distal end of each beam projects through an upwardly accessible hole 107 in roof cover 61 for engagement within an upwardly accessible opening 157 in receiver 155; this approach, however, may not be as water-proof as the preferred embodiment.

Figure 12:
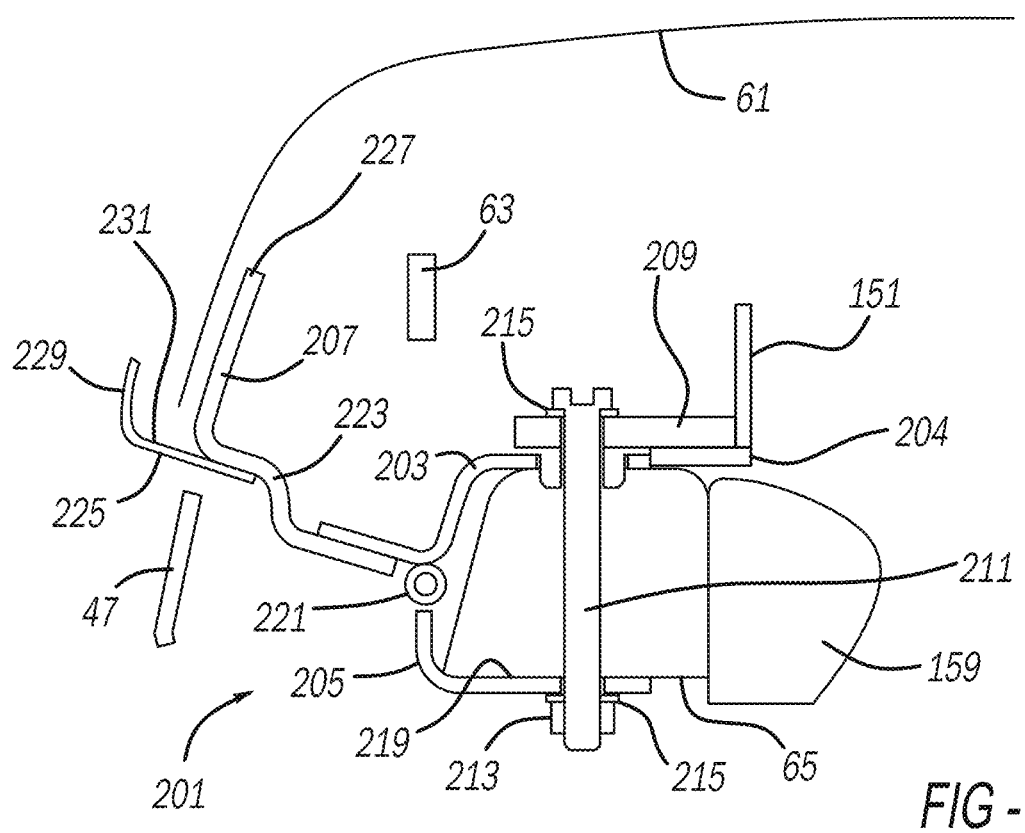
FIG. 12 is an enlarged cross-sectional view, taken along line 12-12 of FIG. 9, showing the roof rack and convertible roof, in a raised position.
Figure 13:
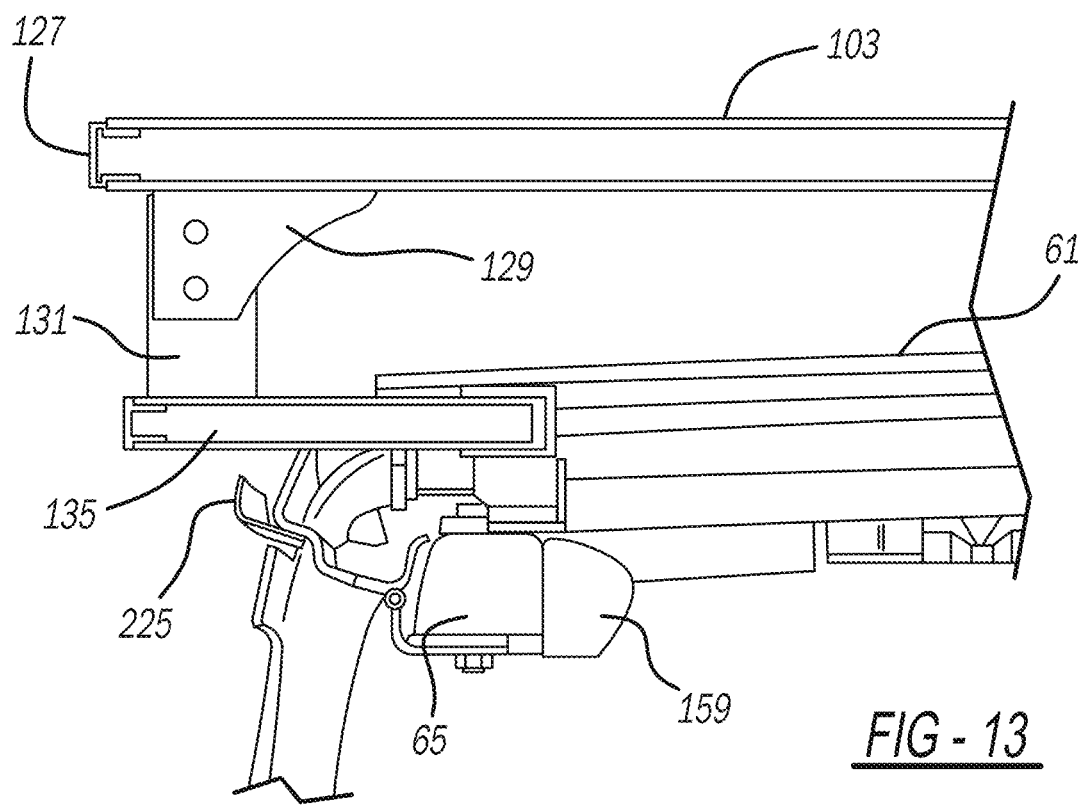
FIG. 13 is an enlarged fragmentary front view, taken along line 10-10 of FIG. 9, showing the roof rack and convertible roof, in a raised position.
Figure 14:
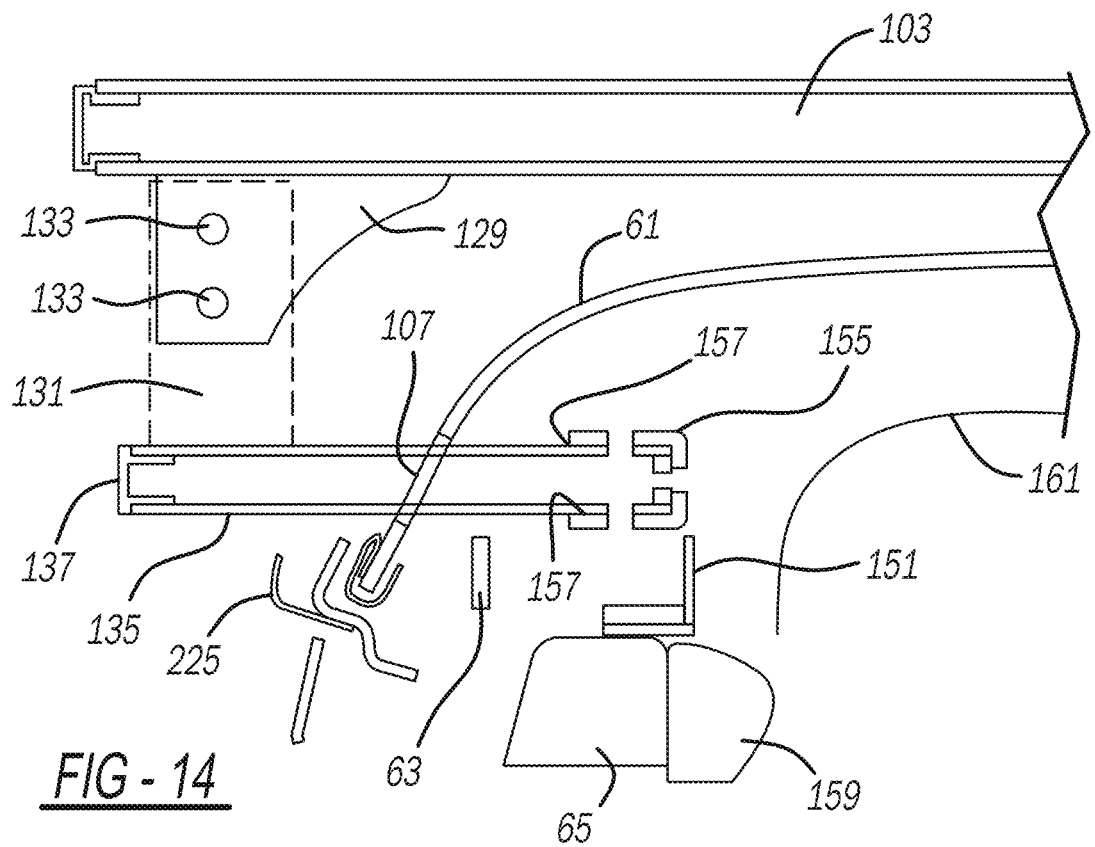
FIG. 14 is an enlarged cross-sectional view, taken along line 10-10 of FIG. 9, showing the roof rack and convertible roof, in a raised position.
Figure 15:
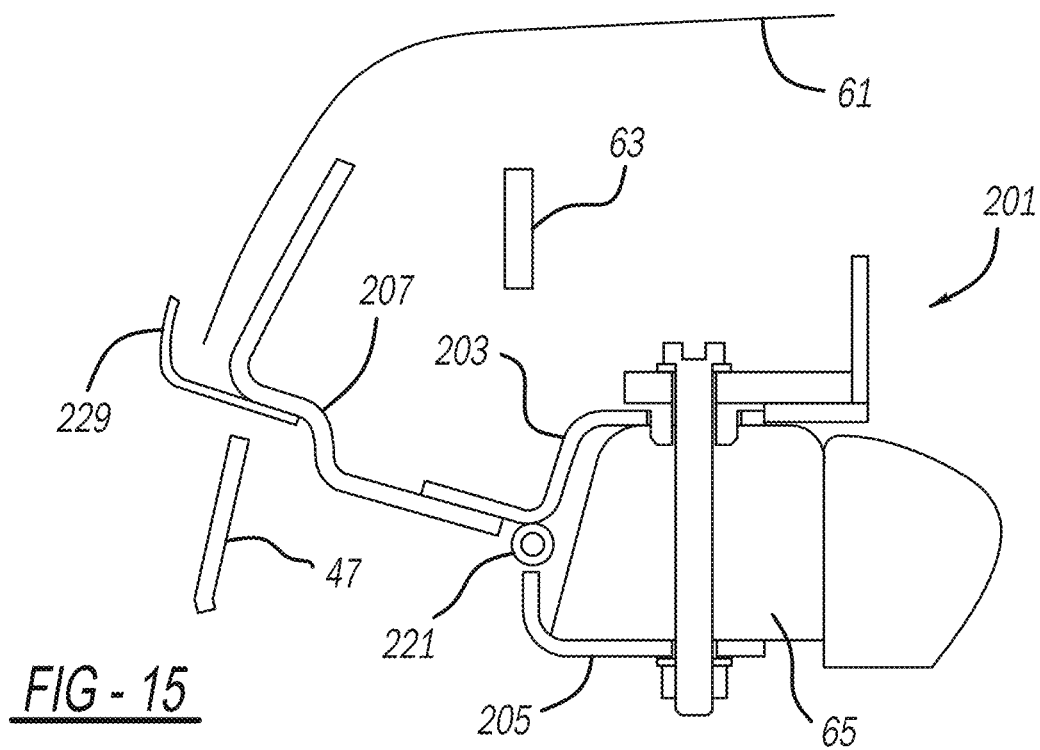
FIG. 15 is an enlarged cross-sectional view, taken along line 15-15 of FIG. 9, showing the roof rack and convertible roof, in a raised position.
Figure 16:
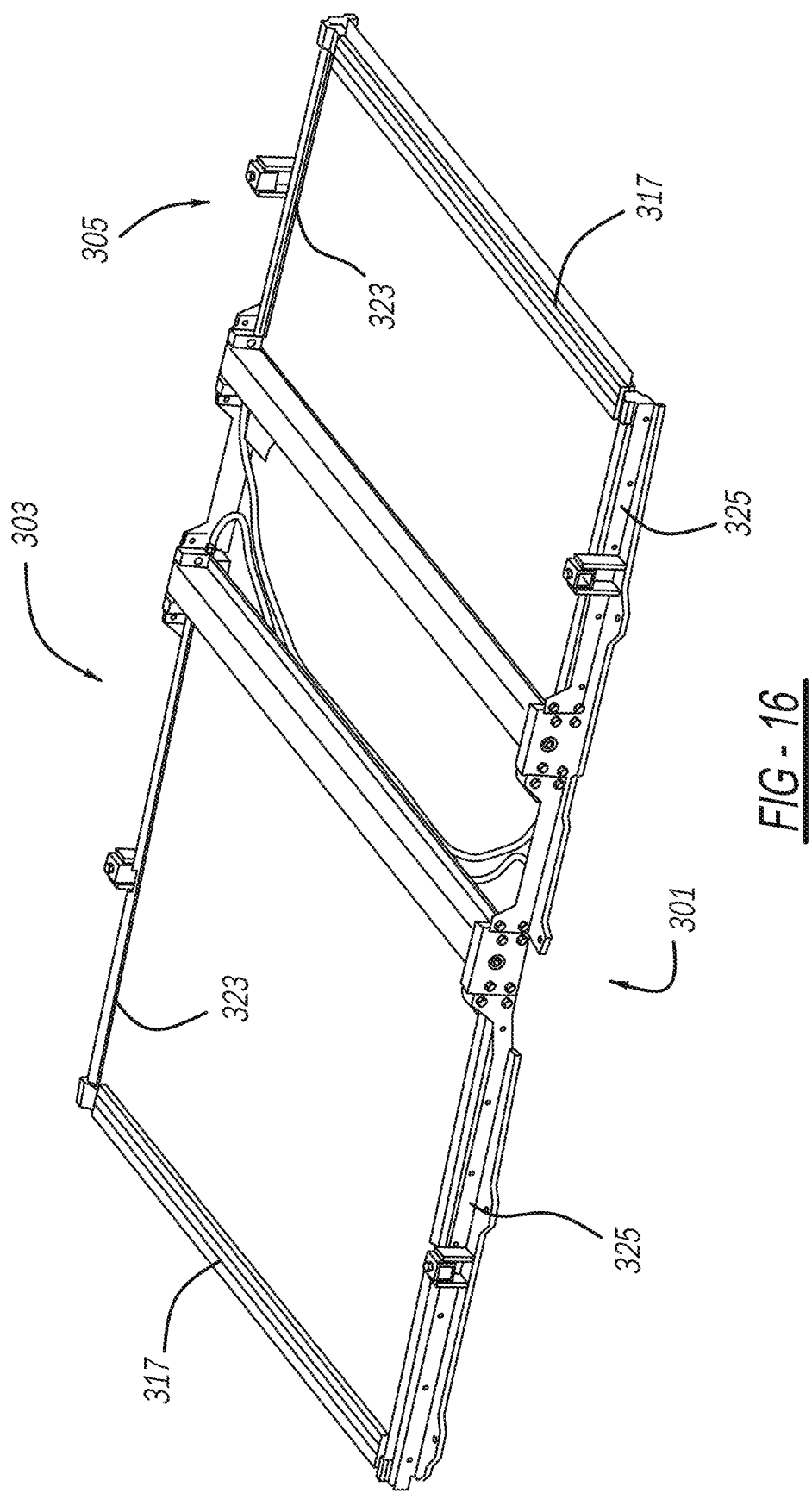
FIG. 16 is a top perspective view showing a sunshade assembly.
Figure 17:
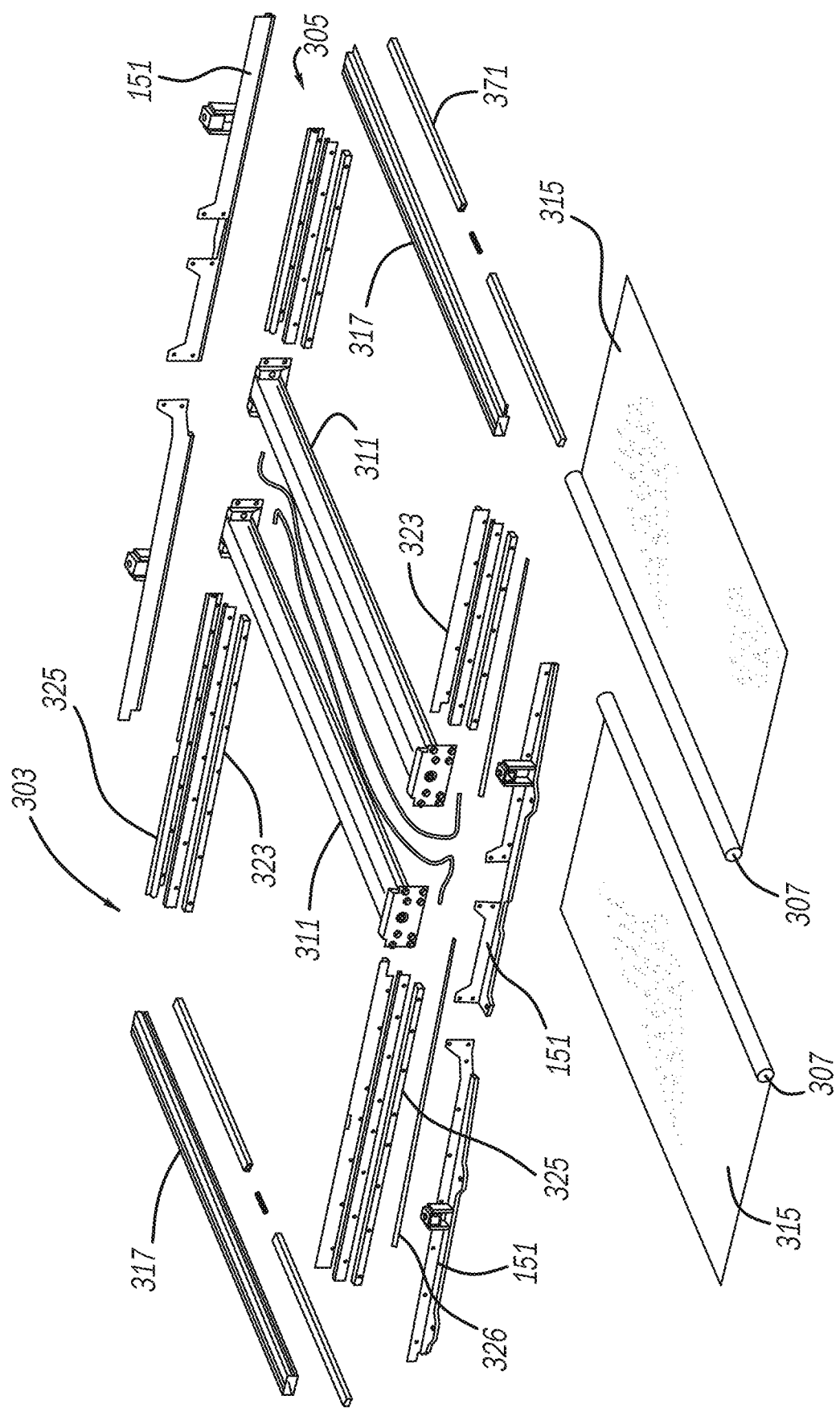
FIG. 17 is an exploded top perspective view showing the sunshade assembly.
Figure 18:
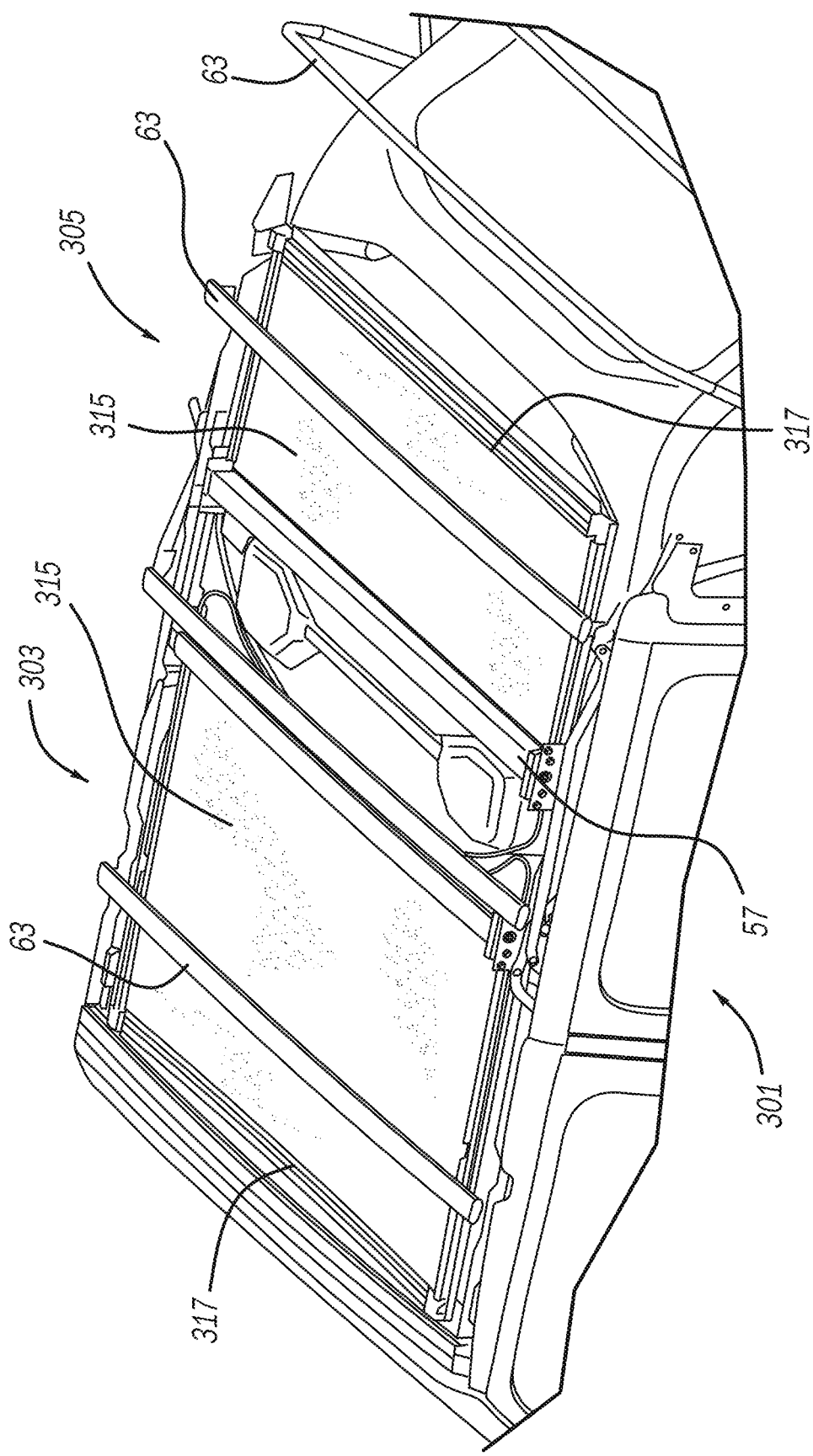
FIG. 18 is a top perspective view of the sunshade assembly and convertible roof, in a raised position with the entire roof cover removed and with the sunshades in extended positions.
Figure 19:
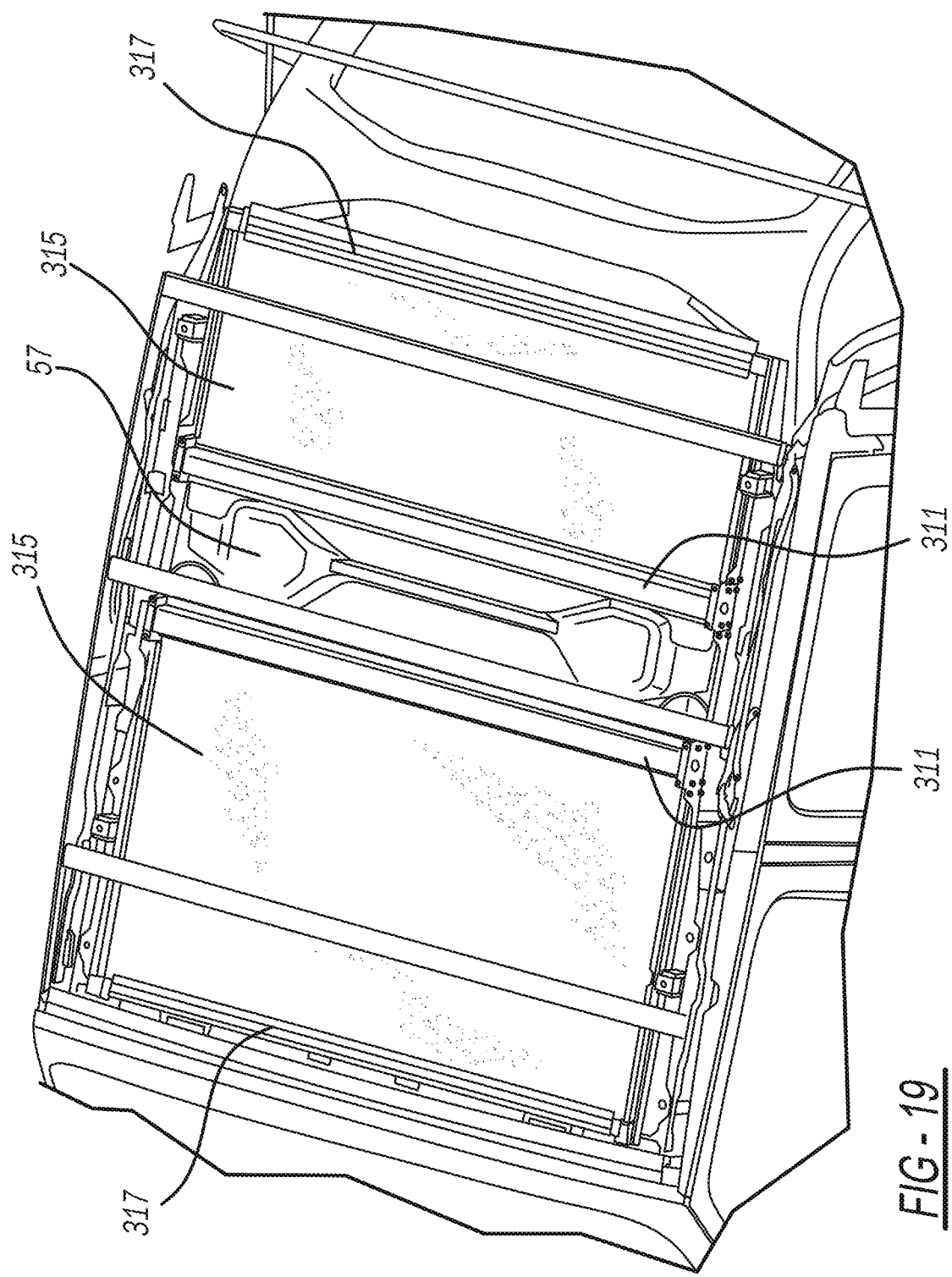
FIG. 19 is a top perspective view of the sunshade assembly and convertible roof, in a raised position with the entire roof cover removed and with the sunshades in extended positions.
Figure 20:
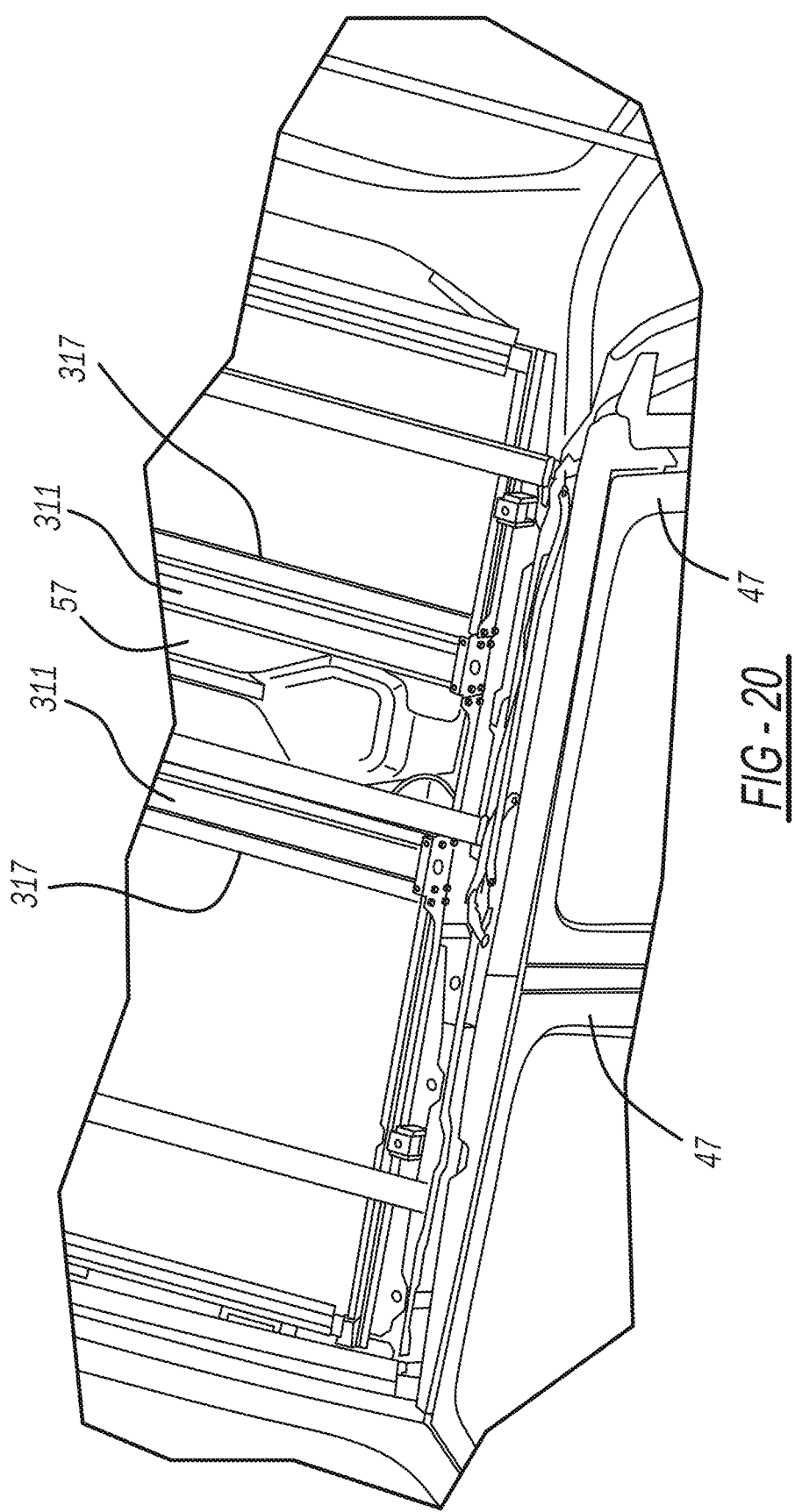
FIG. 20 is an enlarged and fragmentary top perspective view of the sunshade assembly and convertible roof, in a raised position with the entire roof cover removed and with the sunshades in retracted positions.
Figure 21:
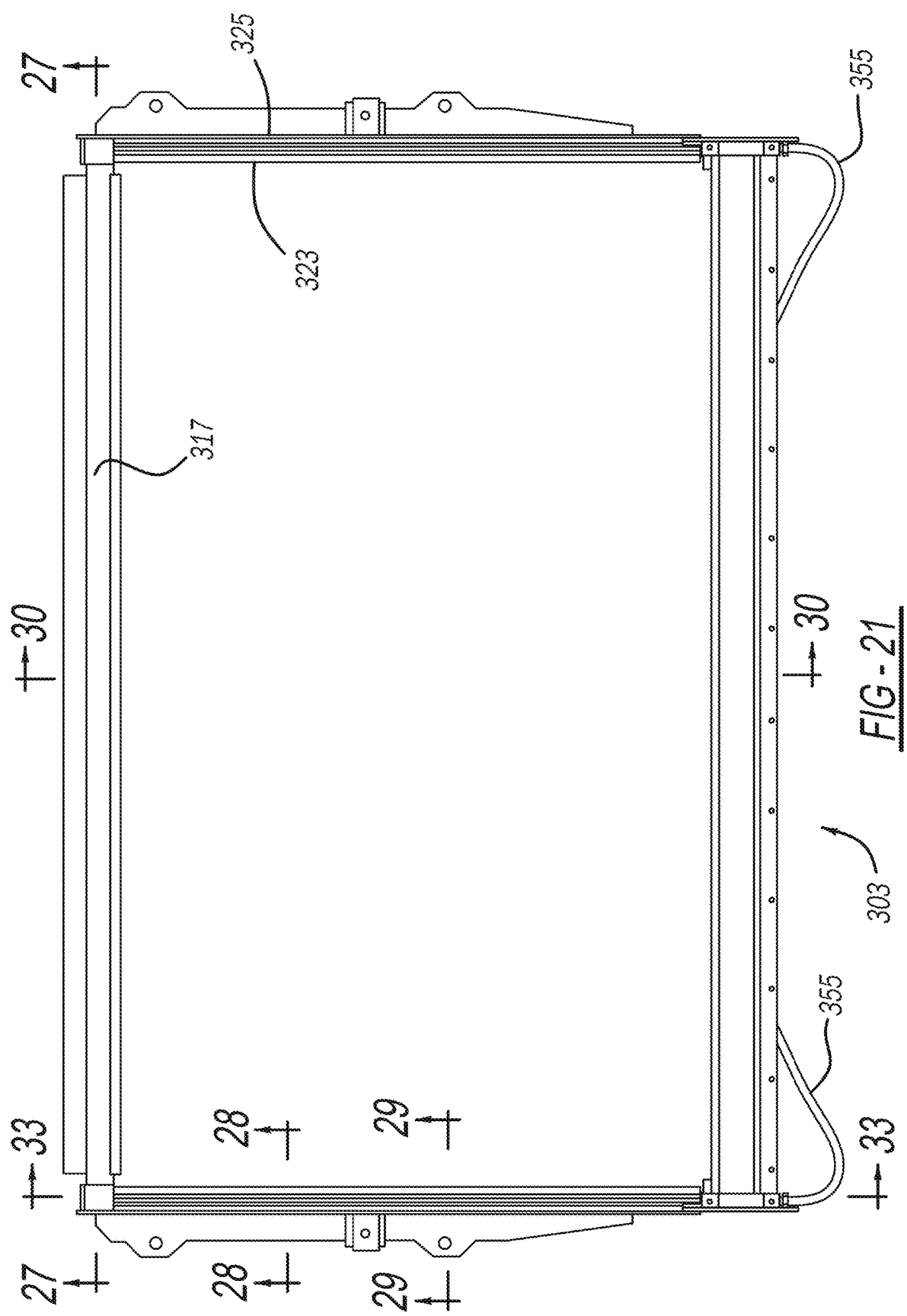
FIG. 21 is a bottom perspective view showing a rear sunshade sub-assembly with the sunshade removed and the leading cross-member in an extended position.
Figure 22:
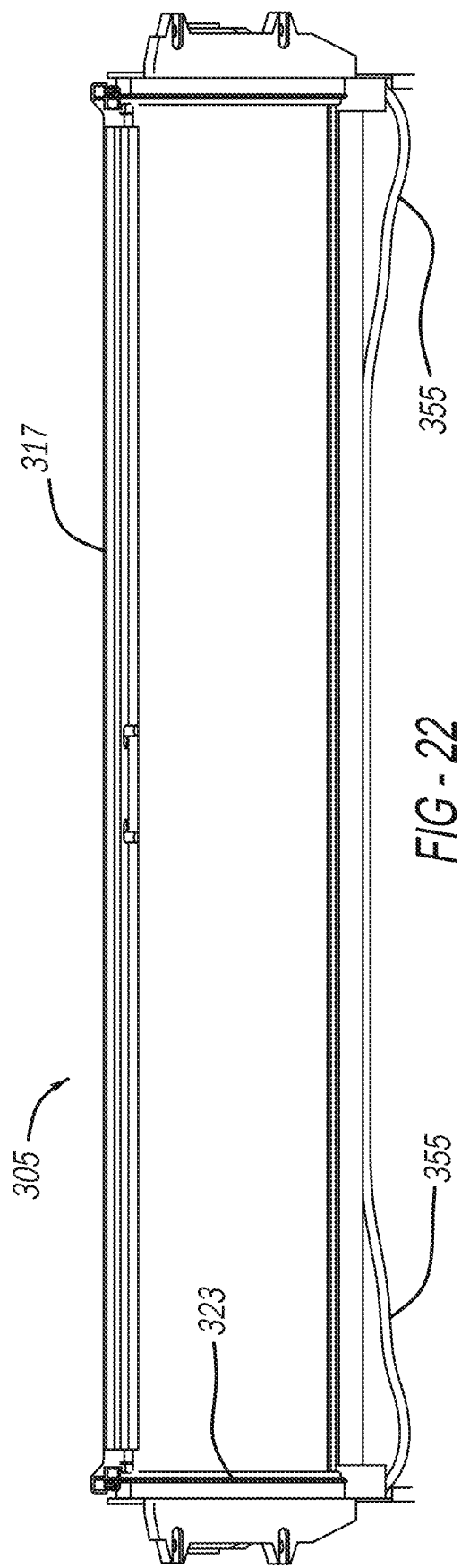
FIG. 22 is a perspective view showing the rear sunshade sub-assembly.
Figure 24:
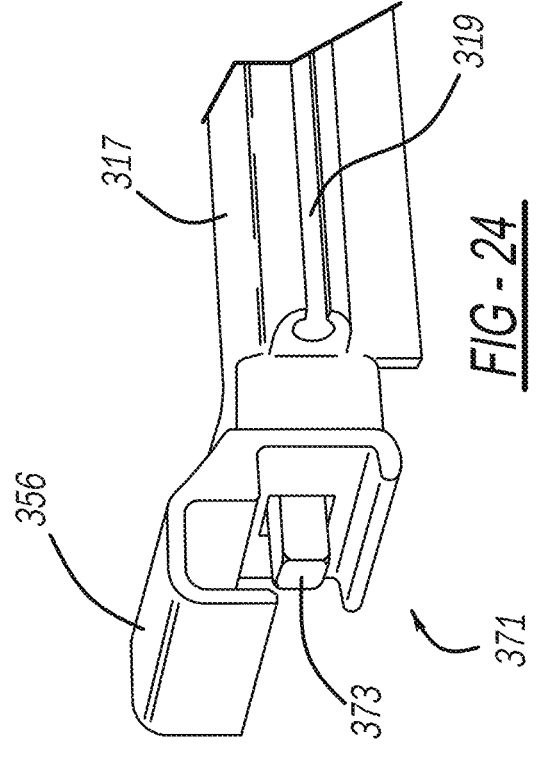
FIG. 24 is a fragmentary perspective view showing a latch of the sunshade assembly.
Figure 23:
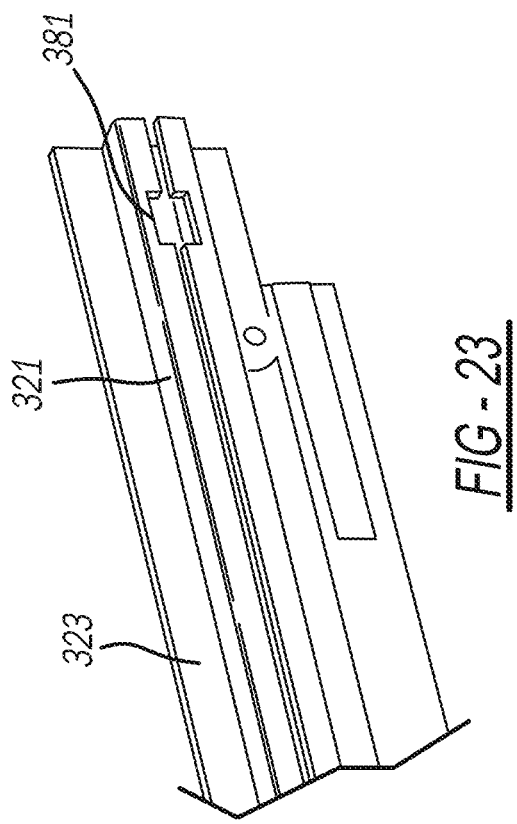
FIG. 23 is a fragmentary perspective view showing a latch receptacle of the sunshade assembly.
Figure 28:
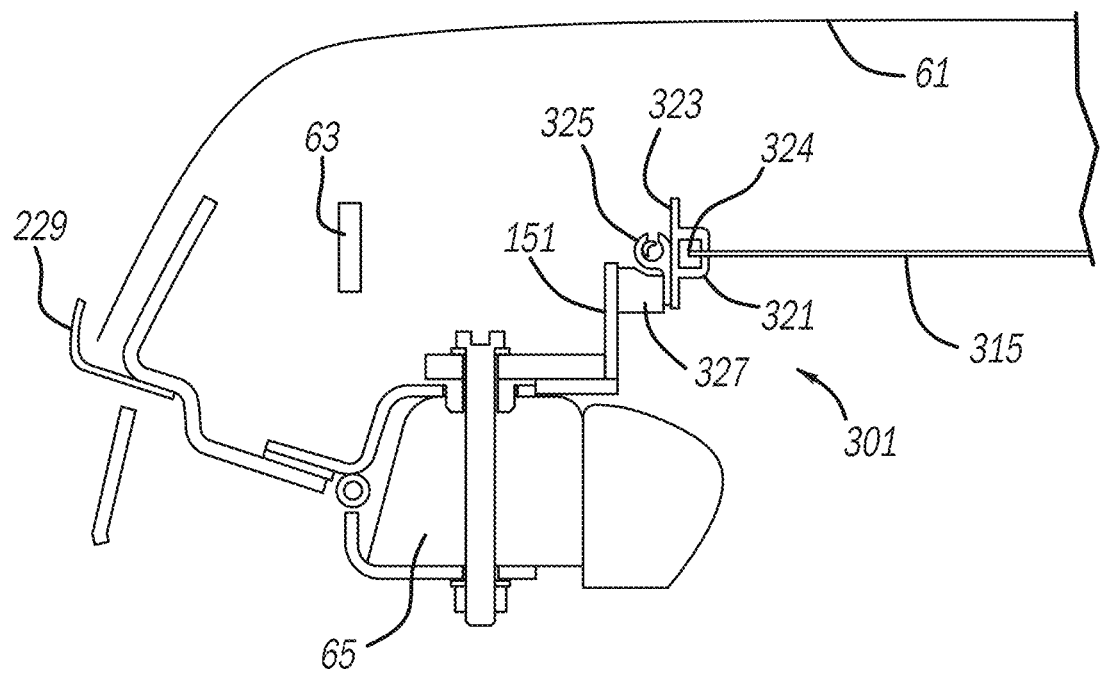
FIG. 28 is an enlarged cross-sectional view, taken along line 28-28 of FIG. 21, showing the sunshade assembly and convertible roof, in the roof raised and sunshade extended positions.
Figure 29:
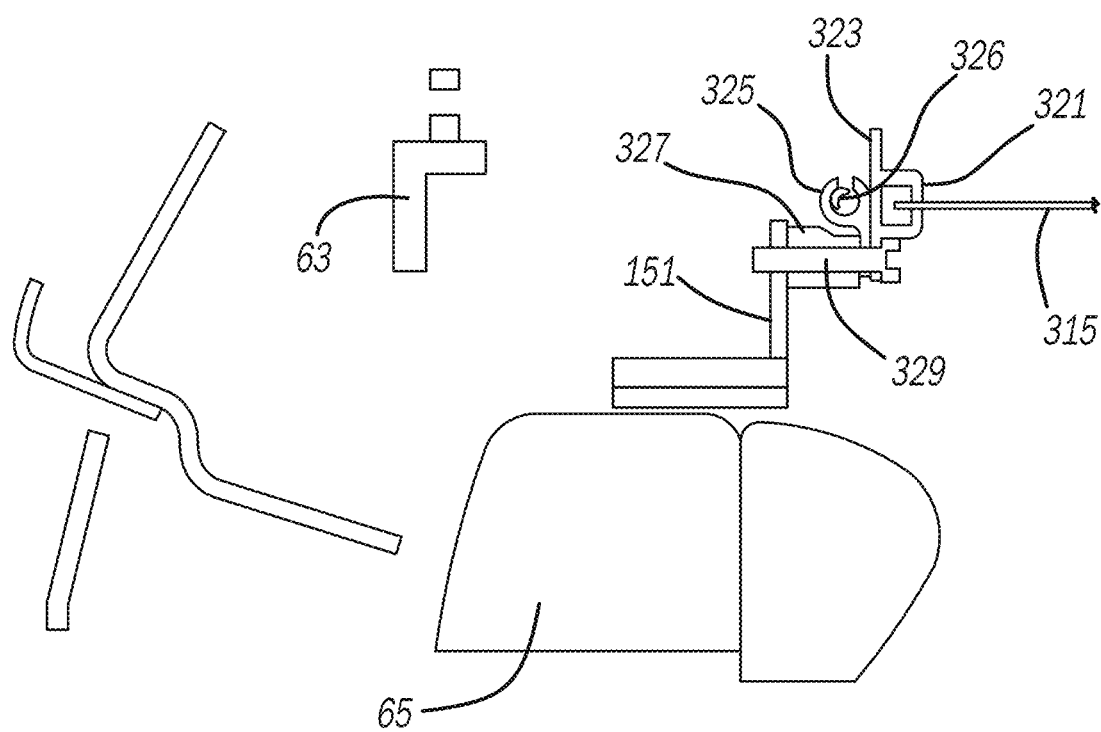
FIG. 29 is an enlarged cross-sectional view, taken along line 29-29 of FIG. 21, showing the sunshade assembly and convertible roof, in the roof raised and sunshade extended positions, but with the roof cover removed.
Figure 30:
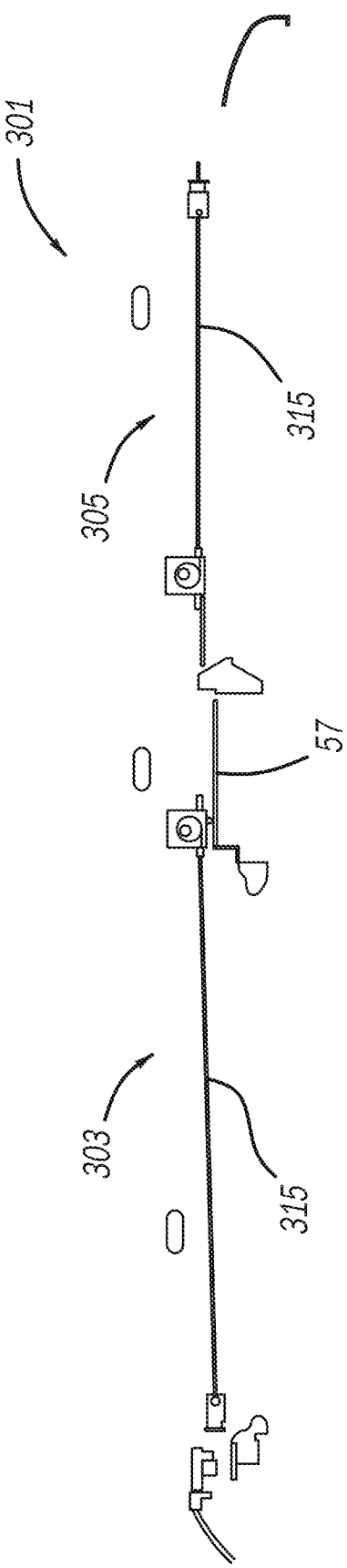
FIG. 30 is a cross-sectional view, taken along line 30-30 of FIG. 21, showing the sunshade assembly, with the front and rear sunshades in extended positions.
Figure 31:
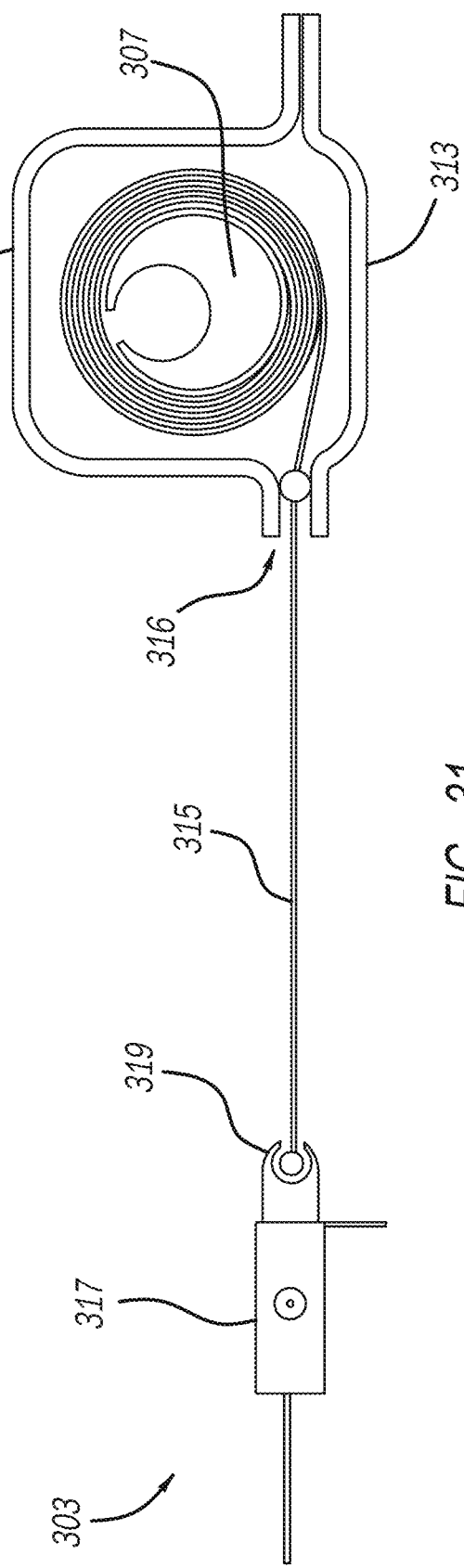
FIG. 31 is an enlarged cross-sectional view, taken along line 30-30 of FIG. 21, showing the front sunshade sub-assembly, with the front sunshade in the extended position.

FIGS. 12 and 15 show a hinge and water channel assembly 201 for use with the convertible top. Assembly 201 includes an upper frame 203, a lower frame 205 and an outer frame 207. Upper frame 203 has a generally Z-shape, an upper ledge 204 of which is sandwiched between a base 209 of brace 151 and an upper surface of roll bar 65 via a threaded screw fastener 211, nut 213, washers 215 and grommet 217. Generally L-shaped lower frame 205 has a ledge 219 coupled between nut 213 and washer 215 on one-hand, and a bottom surface of roll bar 65 on the other-hand.

A hinge 221 moveably couples upper and lower frames 203 and 205. The hinge allows for easier clamping assembly and unclamping disassembly. Furthermore, hinge 221 also accommodates tolerance or cross-sectional thickness variations of roll bar 65 to allow assembly 201 to be placed at different fore-and-aft locations along the roll bar and/or for use in different vehicles with differently dimensioned roll bars or side rails.

A threaded fastener, rivet or weld couples an inboard portion of outer frame 207 to an outboard portion of upper frame 204. Outer frame 207 has a generally L-shape with an intermediate step 223 therein. A generally L-shaped and fore-and-aft elongated water channel 225 has an inboard edge which is coupled to step 223 of outer frame 207. A laterally outboard edge of convertible top 61 is located between an upstanding portion 227 of outer frame 207 and a spaced apart upstanding portion 229 of water channel 225, with a gap between top cover 61 and the water channel to allow water collection and movement within the channel. A lower and cross-car extending portion 231 of water channel 225 is located above a top of front and rear doors 47. Outer frame 207 serves as a door receiving frame such that weatherstrips (not shown) contact between the doors and the outer frame. Moreover, shaft 135 is located and spaced above water channel 225.

Referring to FIGS. 16-33, a sunshade apparatus 301 includes a front sunshade assembly 303 and a rear sunshade assembly 305 which are both secured to stationary roll bars 65 or side rails by way of braces 151. Each sunshade assembly further includes a wind-up roller 307, journalled for rotation about a cross-car lateral axis 309 mounted in upper and lower elongated housings 311 and 313, and a flexible fabric or polymeric sunshade 315 having a trailing edge attached to the roller and moveable through an elongated slot 316 between the housings. A leading edge of each sunshade 315 is attached to a cross-member 317 via a generally C-shaped channel 319 open toward roller 317.

Left and right side edges of each sunshade 315 are located within a generally C-shaped channel 321 of sunshade guide rails 323. Each sunshade side edge has an enlarged formation 324 affixed thereto, such as one side of zipper teeth or a bulbous polymeric molding, that is larger than a side-accessible slot in channel 321. This interlocking enlarged formation-to-channel interface allows the sunshade to longitudinally slide relative to sunshade guide rails 323 while deterring the sunshade from disengaging from the guide rails and flapping due to wind rush as the vehicle moves at high speeds. Thus, this interface retains the sunshades in the cross-car direction when the sunshades are fully or partially extended and when the convertible roof is retracted.

Furthermore, helically wound cables 326, such as Bowden cables, are linearly slideable within surrounding and generally C-shaped cable guide rails 325. Guide rails 323 and 325 may be integrally extruded as a single part for each side of each sunshade, or may be separate parts that are coupled together adjacent each other. Guide rails 323 and 325 each are elongated in a fore-and-after vehicular direction and are stationarily coupled to braces 151 with spacers 327 therebetween, via rivets, threaded fasteners 329, welds or the like. Braces are in turn, mounted to roll bars 65 or side rail structures of the vehicle.

A gear 351, within an outboard gearbox, is coupled to the laterally outboard end of each roller 307. Peripheral teeth of gear 351 engages with the helical windings of the enmeshed cable 326. Thus, as the user manually and longitudinally pushes and pulls a handle attached to leading cross-member 317, tabs 353 extending between each lateral end of cross-member 317 and a leading end of cable 326 cause the cable to longitudinally move along with the cross-member and the attached sunshade. This, in turn, rotates gears 351 which rotates the roller 307 between the gears. Hollow take-up sheaths 355 are stationarily attached to trailing ends of channels 325 to receive cables 326 when sunshade 315 is retracted. Moreover, hook-cross-sectionally shaped sliders 356 moveably couple lateral ends of cross-member 317 around an upper edge of guide rails 323 and 325. It is notable that the present sunshade apparatus rotates the roller in response to manual movement of the leading cross-member and not vice versa as in some more complicated motorized conventional devices.

A latch assembly 371 is coupled to each leading cross-member 317. Latch assembly 371 includes a pair of laterally slidable bars 373 spaced apart and outwardly biased by a centrally located compression spring 375, all of which are mounted within a passageway inside the cross-member. A rotatable or laterally compressible handle 377 includes two pins 379, upper ends of which engage within and inwardly move slide bars 373. Each pin 379 is slidable within a corresponding elongated slot is an underside of cross-member 317. In the nominal condition, when the handle is manually related, spring 375 outwardly biases slide bars 373 (and pins 379) such that distal outboard ends of the slide bars will enter into and interlock with locally enlarged receptacles 381 of channel 321. Each slide bar 373 and receptacle 381 has a generally rectangular side-view shape. When the user manually moves the handle to manually and longitudinally retract the sunshade (in other words, to expose the roof opening), the handle laterally moves the pins and slide bars toward each other and toward a centerline of the vehicle, thereby releasing the slide bars from the receptacles so the leading cross-member is freely movable toward the roller.

Front and rear sunshade assemblies 303 and 305 operate in similar fashions but their extended positions are in opposite longitudinal directions. Moreover, the rollers and leading cross-members of the front and rear sunshade assemblies are all substantially parallel to each other in a cross-car direction and are located along a common horizontal plane below a passenger compartment portion of the convertible roof when in a raised orientation. The front and rear sunshade assemblies may be preassembled together at a separate location from the vehicle assembly, or the front sunshade assembly may be preassembled separately from the rear sunshade assembly to reduce shipping size to the location where they are subsequently assembled to the vehicle.

While various embodiments have been disclosed, it should be appreciated that other variations may be employed. An exemplary top stack linkage mechanism has been disclosed, however, other mechanisms with more or less linkages, rails or bows can be used although certain benefits may not be achieved. Furthermore, exemplary materials and shapes have been identified but other materials and shapes may be employed. It is also envisioned that the roof-rack mounting feature, the water channel hinge feature and the sunshade feature may all be used together or separately. Moreover, each of the features may be interchanged and intermixed between any and all of the disclosed embodiments, and any of the claims may be multiply dependent on and intermixed with any of the others. Additional changes and modifications are not to be regarded as a departure from the spirit or the scope of the present invention.

The invention claimed is:

1. An automotive vehicle, convertible roof apparatus comprising:
   (a) at least one flexible convertible roof cover moveable from a closed position to an open position;
   (b) stationary and side vehicular-mounted receivers each having an opening therein, the receivers being located internal to the roof cover when the roof cover is in the closed position;
   (c) a cross-car elongated, roof rack beam;
   (d) shafts extending below the beam with portions of the roof cover located between distal ends of the shafts and the beam; and
   (e) the distal ends of the shafts projecting through external openings of the roof cover and being removably received within the opening of each of the receivers.

2. The apparatus of claim 1, further comprising:
   a flexible sunshade spanning between a cross-car elongated roller and a cross-car elongated leading member; and
   a latch assembly being coupled to the leading member.

3. The apparatus of claim 2, further comprising:
   a fore-and-after elongated cable operably sliding along a guide rail positioned on a lateral side of the sunshade;
   a handle coupled to the leading member; and
   a gear causing the roller to rotate in response to manual fore-and-aft movement of the leading member.

4. The apparatus of claim 1, further comprising:
   a flexible sunshade moveable from a covering position to a retracted position, the sunshade extending across an upper roof opening when the roof cover is in the open position and the sunshade is in the covering position;
   the sunshade being moveable between the covering and retracted positions when the roof rack beam is attached thereabove; and
   upper portions of stationary roll bars being located above the sunshade and below the roof cover.

5. The apparatus of claim 1, further comprising:
   a topstack mechanism coupled to an underside of the roof cover operably supporting the roof cover in the closed position and folding the roof cover when in the open position;
   stationary roll bars extending in substantially fore-and-after directions, the roof cover being positioned above the roll bars when in the closed position; and
   the roof rack beam includes multiple and substantially parallel, elongated roof rack beams, the roof rack beams being on a plane above an uppermost portion of the roll bars.

6. The apparatus of claim 1, further comprising:
   the openings are spaced apart from each other and located in opposite lateral sides of the roof cover;
   flaps covering the openings to deter water entry therein when the shafts do not extend through the openings, the flaps being moved to expose the openings to allow entry of the shafts therethrough when the shafts are coupled to the receivers; and
   fasteners removably coupling the flaps to the roof cover when the flaps overlie the openings.

7. The apparatus of claim 1, wherein the shafts are elongated in a generally horizontal direction and opposite of the shafts are substantially co-axially aligned with each other.

8. The apparatus of claim 1, further comprising:
extensions projecting in substantially vertical directions adjacent lateral outboard ends of the shafts and the beam; and
the beam, one of the extensions and one of the shafts defining a substantially C-shape;
an inboard end of each of the shafts being located above a stationary vehicular side rail or roll bar; and
the inboard ends of the shafts being slidable relative to the receivers to accommodate lateral vehicular tolerance variations.

9. The apparatus of claim 1, further comprising a water channel assembly comprising:
a fore-and-aft elongated water channel having a portion located below a lateral edge of the roof cover;
a first frame being coupled to the water channel;
a second frame being coupled to the first frame by a hinge; and
the frames being attached to opposite surfaces of a vehicular side rail or roll bar.

10. The apparatus of claim 1, further comprising:
a sport utility vehicle comprising a passenger compartment with four passenger doors and a rear cargo compartment located behind the passenger compartment;
roll bars stationarily affixed to the vehicle above the passenger and cargo compartments;
a topstack mechanism, including roof bows and linkages, moving the roof cover between the open and closed positions;
a second roof rack beam and a second pair of the shafts, the roof rack beams being substantially parallel to and longitudinally spaced apart from each other;
the receivers removably coupling the shafts to the vehicle; and
a container removably mounted on top of the roof rack beams.

11. An automotive vehicle, convertible roof apparatus comprising:
(a) a flexible convertible roof cover;
(b) a topstack mechanism comprising cross-car elongated roof bows and linkages coupled thereto, the roof bows being coupled to the roof cover and being configured to move the roof cover between raised and lowered positions;
(c) cross-car elongated, roof rack beams located above the roof cover when the roof cover is in the raised position and when the roof rack beams are in functional positions, the roof rack beams being longitudinally spaced apart from each other;
(d) shafts inwardly extending toward a vehicular centerline in substantially horizontal directions, each of the shafts extending through an associated opening in the roof cover when the roof rack beams are in the functional positions; and
(e) extensions coupling outboard portions of the roof rack beams to the shafts.

12. The apparatus of claim 11, further comprising:
a flexible sunshade moveable from a covering position to a retracted position, the sunshade extending across an upper open area when the roof cover is in the lowered position and the sunshade is in the covering position;
the sunshade being moveable between the covering and retracted positions when the roof rack beams are attached thereabove;
a cross-car elongated roller attached to a trailing edge of the sunshade; and
a cross-car elongated leading member attached to a leading edge of the sunshade.

13. The apparatus of claim 11, further comprising:
a flexible and retractable sunshade;
a fore-and-after elongated cable operably sliding along a guide rail positioned on a lateral side of the sunshade;
a handle coupled to the sunshade;
a gear causing the roller to rotate in response to manual fore-and-aft movement of the sunshade and the handle; and
a latch assembly being coupled to the sunshade.

14. The apparatus of claim 11, further comprising:
the openings are spaced apart from each other and located in opposite lateral sides of the roof cover;
flaps covering the openings to deter water entry therein when the shafts do not extend through the openings, the flaps being moved to expose the openings to allow entry of the shafts therethrough; and
fasteners removably coupling the flaps to the roof cover when the flaps overlie the openings.

15. The apparatus of claim 11, further comprising:
one of the beams, one of the extensions and one of the shafts defining a substantially C-shape;
an inboard end of each of the shafts being located above a stationary vehicular side rail or roll bar; and
the inboard ends of the shafts being slidable relative to side rail or roll bar-mounted receivers to accommodate lateral vehicular tolerance variations.

16. The apparatus of claim 11, further comprising:
a fore-and-aft elongated water channel having a portion located below a lateral edge of the roof cover;
a first frame being coupled to the water channel;
a second frame being coupled to the first frame by a hinge; and
the frames being attached to opposite surfaces of a vehicular side rail or roll bar.

17. The apparatus of claim 11, further comprising:
a sport utility vehicle comprising a passenger compartment with passenger doors and a rear cargo compartment located behind the passenger compartment;
roll bars stationarily affixed to the vehicle above the passenger and cargo compartments;
hollow receivers removably coupling the shafts to the vehicle; and
a container removably mounted on top of the roof rack beams.

18. An automotive vehicle, convertible roof apparatus comprising:
(a) a flexible convertible roof;
(b) moveable cross-car elongated roof bows coupled to the roof and being configured to move the roof between raised and lowered positions;
(c) cross-car elongated, roof rack beams located above the roof when the roof is in the raised position;
(d) shafts extending through openings in the roof, the shafts being coupled to the roof rack beams;
(e) covers operably covering the openings when the roof rack beams are removed from above the roof, the covers operably allowing access to the openings to allow entry of the shafts therethrough when the roof rack beams are located above the roof;
(f) a flexible sunshade moveable from an extended position to a retracted position;
(g) a roller coupled to a trailing edge of the sunshade;
(h) the sunshade being manually moveable between the extended and retracted positions when the roof rack beams are attached thereabove;

(i) manual sliding of the sunshade solely causing the roller to rotate.

19. The apparatus of claim 18, further comprising:
a fore-and-aft elongated water channel having a portion located below a lateral edge of the roof cover;
a first frame being coupled to the water channel;
a second frame being coupled to the first frame by a hinge; and
the frames being configured for attachment to opposite surfaces of a vehicular side rail or roll bar.

20. The apparatus of claim 18, further comprising:
a sport utility vehicle comprising a passenger compartment with passenger doors and a rear cargo compartment located behind the passenger compartment;
roll bars stationarily affixed to the vehicle above the passenger and cargo compartments;
hollow receivers removably coupling the shafts to the vehicle; and
a container removably mounted on top of the roof rack beams.

21. An automotive vehicle, convertible roof apparatus comprising:
(a) a flexible convertible roof cover;
(b) moveable cross-car elongated roof bows coupled to the roof and being configured to move the roof between closed and open positions;
(c) multiple flexible sunshades slidable from extended positions to retracted positions in opposite directions from each other, one of the sunshades being longitudinally forward of the other;
(g) rollers each being coupled to a trailing edge of an associated one of the sunshades;
(h) the sunshade being manually moveable between the extended and retracted positions when the roof cover is in the open position;
(i) manual sliding of the sunshade solely causing the roller to rotate;
(j) cross-car elongated leading supports each being coupled to a leading edge of an associated one the sunshades;
(k) at least one spring biased latch being coupled to at least one of the leading members;
(l) fore-and-aft elongated cables each being positioned on a lateral side of an associated one of the sunshades;
(m) gears causing the rollers to rotate in response to manual fore-and-aft movement of the leading members;
(n) handles being coupled to the leading members.

* * * * *